United States Patent
Kawanishi et al.

(10) Patent No.: US 9,726,533 B2
(45) Date of Patent: Aug. 8, 2017

(54) WEIGHING APPARATUS HAVING A LOSS-IN WEIGHT HOPPER

(75) Inventors: Shozo Kawanishi, Hyogo (JP); Akinari Okunosono, Hyogo (JP); Mitsushi Nishikawa, Hyogo (JP); Masatomi Tsuruoka, Hyogo (JP); Hiroyuki Inami, Hyogo (JP); Kuninori Kozai, Hyogo (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 274 days.

(21) Appl. No.: 13/980,568

(22) PCT Filed: Nov. 2, 2011

(86) PCT No.: PCT/JP2011/006144
§ 371 (c)(1),
(2), (4) Date: Sep. 30, 2013

(87) PCT Pub. No.: WO2012/098603
PCT Pub. Date: Jul. 26, 2012

(65) Prior Publication Data
US 2014/0014414 A1    Jan. 16, 2014

(30) Foreign Application Priority Data
Jan. 20, 2011 (JP) .................................. 2011-010231

(51) Int. Cl.
*G01G 13/06* (2006.01)
*G01G 13/24* (2006.01)
(Continued)

(52) U.S. Cl.
CPC ........... *G01G 13/24* (2013.01); *G01G 11/086* (2013.01); *G01G 13/06* (2013.01); *G01G 19/387* (2013.01)

(58) Field of Classification Search
CPC .... G01G 19/387; G01G 19/393; G01G 11/06; G01G 13/06; G01G 13/24; G01G 11/086
See application file for complete search history.

(56) References Cited

U.S. PATENT DOCUMENTS 3,611,905 A * 10/1971 Brinks ................... B65G 53/24
406/122
3,707,172 A * 12/1972 Obara ...................... B65B 1/32
141/128
(Continued)

FOREIGN PATENT DOCUMENTS

JP    60-082818    5/1985
JP    62-009226    1/1987
(Continued)

OTHER PUBLICATIONS

International Search Report for PCT/JP2011/006144, dated Nov. 24, 2011.
(Continued)

*Primary Examiner* — Randy Gibson
(74) *Attorney, Agent, or Firm* — Marshall, Gerstein & Borun LLP

(57) ABSTRACT

A weighing apparatus comprise a large throw-in weighing hopper which is fed with objects having a weight which is less than a target weight of the objects, holds the objects which are weighed, and discharges the weighed objects; a plurality of medium throw-in weighing hoppers which are respectively fed with the objects having weights adjusted with a different ratio, hold the objects for which combination calculation is performed based on the weights of the objects, and discharge the objects based on a result of the combination calculation; and a loss-in weight hopper which is used in loss-in weighing and performs loss-in discharge of the objects.

20 Claims, 7 Drawing Sheets

(51) Int. Cl.
*G01G 11/08* (2006.01)
*G01G 19/387* (2006.01)

(56) References Cited

U.S. PATENT DOCUMENTS

| | | | | |
|---|---|---|---|---|
| 3,720,241 A * | 3/1973 | Bryant | ................ | B65G 69/182 141/25 |
| 4,100,984 A * | 7/1978 | Klopfenstein et al. | ......... | 177/50 |
| 4,111,336 A * | 9/1978 | Ward et al. | ...................... | 222/58 |
| 4,134,466 A * | 1/1979 | Steele | .................... | G01G 21/22 177/114 |
| 4,453,575 A * | 6/1984 | Del Rosso | ...................... | 141/83 |
| 4,615,403 A * | 10/1986 | Nakamura | ............. | G01G 11/12 177/121 |
| 4,733,363 A * | 3/1988 | Yamada | ................. | G01G 19/42 177/1 |
| 4,766,966 A * | 8/1988 | Nagao et al. | .................. | 177/123 |
| 4,828,054 A * | 5/1989 | Mosher | ...................... | 177/25.18 |
| 5,103,401 A * | 4/1992 | Johnson | ............... | G05D 7/0623 177/105 |
| 5,240,185 A * | 8/1993 | Kaiju | ......................... | B01J 8/36 222/412 |
| 5,289,911 A * | 3/1994 | Compton | .............. | B65G 31/02 198/638 |
| 5,767,453 A * | 6/1998 | Wakou | ................. | G01G 19/393 177/103 |
| 5,894,111 A * | 4/1999 | Kawanishi | ................. | 177/25.18 |
| 5,910,646 A * | 6/1999 | Kawanishi | ........... | G01G 19/393 177/25.18 |
| 6,060,667 A * | 5/2000 | Pollock | .................. | G01G 13/08 177/121 |
| 6,168,305 B1 * | 1/2001 | Marmsater | ..................... | 700/240 |
| 6,271,486 B1 * | 8/2001 | Franklin | .............. | B65D 90/585 177/105 |
| 6,502,013 B1 * | 12/2002 | Sosnik | ................... | G01G 13/06 177/116 |
| 6,545,230 B2 * | 4/2003 | Tamai | .................... | G01G 19/42 177/121 |
| 7,019,224 B2 * | 3/2006 | Kawanishi et al. | ........ | 177/25.18 |
| 8,701,565 B2 * | 4/2014 | Creighton | ................ | B61D 7/00 105/377.01 |

FOREIGN PATENT DOCUMENTS

| | | |
|---|---|---|
| JP | 62-119413 | 5/1987 |
| JP | 8-278189 | 10/1996 |
| JP | 08-313327 | 11/1996 |
| JP | 10-054750 | 2/1998 |
| JP | 2004-125422 A | 4/2004 |

OTHER PUBLICATIONS

K-Tron "Smart Feeding & Conveying Solutions Contained Batch Dispensing of Pharmaceuticals via Gain-in-Weight Technology Loss-in-Weight Batch Gain-in-Weight Batch Background", Jul. 17, 2009.
Extended European Search Report from EP Application No. 11856362, dated Mar. 24, 2015.

* cited by examiner

WEIGHING APPARATUS HAVING A LOSS-IN WEIGHT HOPPER

TECHNICAL FIELD

The present invention relates to a weighing apparatus. Particularly, the present invention relates to a weighing apparatus which adjusts a weight of objects such as powdered products (detergent, fertilizer, etc.), or granular products (resin pellets, cereal, feeding stuff, etc.) so that a predetermined target weight is attained, and charges the objects into containers such as bags.

BACKGROUND ART

To reduce a weight of products, easily achieve mass production of products using injection molding devices, etc., there has been an increasing demand for resin called engineering plastic which can replace metal. To efficiently lump together resin pellets which are raw materials for this resin molding process such that the resin pellets have a target weight and charge the resin pellets into bags, a packer scale has been conventionally used.

The packer scale is one kind of an automatic weighing apparatus which adjusts a weight of objects such as powdered products (detergent, fertilizer, etc.), or granular products (resin pellets, cereal, feeding stuff, etc.) so that a predetermined target weight is attained, and charges the objects into containers such as bags. The packer scale is typically constructed to include components such as throw-in cut gates, hoppers, hopper gates, load cells and actuators. According to intended uses, a variety of packer scales have been proposed.

For example, a technique is known, in which the objects are fed to hoppers using timer charging by controlling open time of cut gates (see Patent Literatures 1 and 2).

There is also proposed an apparatus intended to achieve high-speed weighing and highly-accurate weighing of objects by volume throw-in of the objects to hoppers and a combination of a plurality of complementary throw-in volumes which are different in volume ratio (e.g., 1:2:4:8) (see Patent Literatures 3, 4, and 5).

There is also proposed an apparatus intended to achieve high-speed weighing and highly-accurate weighing of objects by volume throw-in of the objects to hoppers and complementary throw-in of the objects using loss-in discharge (see Patent Literature 6).

CITATION LIST

Patent Literature

Patent Literature 1: Japanese Laid-Open Patent Application Publication No. Sho 60-82818

Patent Literature 2: Japanese Laid-Open Patent Application Publication No. Sho. 62-119413

Patent Literature 3: Japanese Laid-Open Patent Application Publication No. Hei. 8-278189

Patent Literature 4: Japanese Laid-Open Patent Application Publication No. 2004-125422

Patent Literature 5: Japanese Laid-Open Patent Application Publication No. Sho 62-9226

Patent Literature 6: Japanese Laid-Open Patent Application Publication No. Hei. 10-54750

SUMMARY OF INVENTION

Technical Problem

In weighing of the objects using the packer scale, it is generally considered that achievement of its higher speed and achievement of its higher accuracy are inconsistent with each other. That is, when an attempt is made to improve weighing accuracy of the objects in the packer scale, it is necessary to suppress the weighing speed of the objects. On the other hand, when an attempt is made to increase the weighing speed of the objects, the weighing accuracy of the objects degrades.

The present inventors are now intensively engaged in development of the packer scale which is able to achieve high-speed and highly-accurate weighing of the objects such as the resin pellets. In the course of this development, it has been gradually revealed that there is a limitation on improvement of performance of the apparatus which is aimed at realizing high-speed weighing and highly-accurate weighing of the objects by mere design change of existing equipment illustrated in Patent Literatures 1 to 6. And, it has been concluded that to significantly improve the performance of the packer scale (achievement of high-speed weighing and highly-accurate weighing of objects), drastic revision of a structure of a conventional example is essential.

The present invention has been developed under the above stated circumstances, and an object of the present invention is to provide a weighing apparatus which has a space-saving structure and is able to make weighing speed and weighing accuracy of the objects higher than those of a conventional example.

Solution to Problem

To achieve the above mentioned objective, a weighing apparatus of the present invention comprises a large throw-in weighing hopper which is fed with objects having a weight which is less than a target weight of the objects, holds the objects which are weighed, and discharges the weighed objects; a plurality of medium throw-in weighing hoppers which are respectively fed with the objects having weights adjusted with a different ratio, hold the objects for which combination calculation is performed based on the weights of the objects, and discharge the objects based on a result of the combination calculation; and a loss-in hopper which is used in loss-in weighing and performs loss-in discharge of the objects.

In accordance with this configuration, in the weighing apparatus of the present invention, the large throw-in weighing hopper, the plurality of medium throw-in weighing hoppers, and the loss-in hopper can be suitably cooperated with each other in weighing and discharge of the objects. As a result, the weighing apparatus of the present invention is able to make weighing speed and weighing accuracy of the objects higher than those of a conventional example. For example, to adjust the weight of the objects so that a target weight is finally attained, highly-accurate loss-in discharge can be used. Therefore, the weighing apparatus of the present invention is able to maintain high weighing accuracy (cut accuracy) of the objects.

In the weighing apparatus of the present invention, the medium throw-in weighing hoppers and the loss-in hopper may be placed around the large throw-in weighing hopper in a plan view of the large throw-in weighing hopper.

In accordance with this configuration, in the weighing apparatus of the present invention, since the plurality of medium throw-in weighing hoppers and the loss-in hopper are arranged in suitable locations surrounding the large throw-in weighing hopper, around the large throw-in weighing hopper, a space saving structure is provided, in which the objects are discharged from the medium throw-in weighing hoppers and the small throw-in weighing hopper in a non-dispersed manner.

In the weighing apparatus of the present invention, when the large throw-in weighing hopper is enclosed by a virtual rectangle in the plan view of the large throw-in weighing hopper, one of the medium throw-in weighing hoppers and the loss-in hopper may be aligned so as to face one side of the rectangle along the one side of the rectangle, and the ratio of the weight of the objects held inside of the one of the medium throw-in weighing hoppers may be greatest.

In accordance with this configuration, since the medium throw-in weighing hopper which is greatest in the ratio of the weight of the objects is placed such that this medium throw-in weighing hopper and the loss-in hopper which is smallest in the ratio of the weight of the objects are aligned, it becomes easier to ensure a desired throw-in amount required for the throw-in of the objects to this medium throw-in weighing hopper. As a result, weighing speed of the objects can be increased, and hence one cycle time of throw-in, weighing and discharge of the objects which are performed by the weighing apparatus can be reduced.

In the weighing apparatus of the present invention, when the large throw-in weighing hopper is enclosed by a virtual rectangle in the plan view of the large throw-in weighing hopper, three of the medium throw-in weighing hoppers may be aligned so as to face one side of the rectangle along the one side of the rectangle, and the ratio of the weight of the objects held inside of the medium throw-in weighing hopper located at a center, of the aligned three medium throw-in weighing hoppers, may be greater than the ratios of the weights of the objects held inside of the medium throw-in weighing hoppers located at ends of the aligned three medium throw-in weighing hoppers.

In accordance with this configuration, since the medium throw-in weighing hopper which is greater in the ratio of the weight of the objects is located at the center of the aligned medium throw-in weighing hoppers, and the medium throw-in weighing hoppers which are smaller in the ratio of the weight of the objects are located at the ends of the aligned medium throw-in weighing hoppers, it becomes easier to ensure a desired throw-in amount required for the throw-in of the objects to the medium throw-in weighing hopper located at the center. As a result, weighing speed of the objects can be increased, and hence one cycle time of throw-in, weighing and discharge of the objects which are performed by the weighing apparatus can be reduced.

In the weighing apparatus of the present invention, the ratio of the weights of the objects may be adjusted based on open times of discharge outlets of medium throw-in chutes placed above the medium throw-in weighing hoppers.

In accordance with this configuration, the weight ratio of the objects in the medium throw-in weighing hoppers can be adjusted flexibly. As a result, weighing speed and weighing accuracy of the objects can be easily improved.

In the weighing apparatus of the present invention, throw-in of the objects to the large throw-in weighing hopper may be performed by timer charging, using a cut gate placed above the large throw-in weighing hopper.

In accordance with this configuration, in the weighing apparatus of the present invention, volume throw-in of a most part (e.g., equal to greater than 95%) of the objects to the large throw-in weighing hopper is performed with a proper amount at a time, by using timer charging of the objects using the cut gate. As a result, weighing (throw-in) speed of the objects can be increased, and hence one cycle time of throw-in, weighing and discharge of the objects which are performed by the weighing apparatus can be reduced.

In the weighing apparatus of the present invention, at least a pair of throw-in timings among a timing at which the objects are thrown-in to the large throw-in weighing hopper, timings at which the objects are thrown-in to the medium throw-in weighing hoppers, and a timing at which the objects are thrown-in to the loss-in hopper, may overlap with each other.

For example, the timing at which the objects are thrown-in to the large throw-in weighing hopper and the timings at which the objects are thrown-in to the medium throw-in weighing hoppers, may overlap with each other.

In accordance with this configuration, in the weighing apparatus of the present invention, weighing (throw-in) speed of the objects can be increased, and hence one cycle time of throw-in, weighing and discharge of the objects which are performed by the weighing apparatus can be reduced.

In the weighing apparatus of the present invention, a timing at which the objects are discharged from the large throw-in weighing hopper, timings at which the objects are discharged from the medium throw-in weighing hoppers, and a timing at which the objects are discharged from the loss-in hopper, may overlap with each other.

In accordance with this configuration, in the weighing apparatus of the present invention, weighing (discharge) speed of the objects can be increased, and hence one cycle time of throw-in, weighing and discharge of the objects which are performed by the weighing apparatus can be reduced.

In the weighing apparatus of the present invention, in the combination calculation, a combination of the medium throw-in weighing hoppers in which a total weight of the objects inside of the medium throw-in weighing hoppers is closest to a predetermined combination target weight may be found, and the objects may be discharged from the medium throw-in weighing hoppers selected to make up the combination.

In the weighing apparatus of the present invention, the combination target weight may be set based on the target weight of the objects, the weight of the objects held inside of the large throw-in weighing hopper, and the weight of the objects in the loss-in discharge.

In accordance with this configuration, in the weighing apparatus of the present invention, it becomes possible to appropriately perform the loss-in discharge of the objects for adjusting the weight of the objects so that the target weight is finally attained, (e.g., loss-in discharge amount can be set small), following the combination selection discharge of the objects. Hence, it becomes possible to improve weighing speed and weighing accuracy (cut accuracy) of the objects.

Advantageous Effects of Invention

In accordance with the present invention, it is possible to attain a weighing apparatus which has a space saving structure and makes weighing speed and weighing accuracy of the objects higher than those of a conventional example.

BRIEF DESCRIPTION OF DRAWINGS

FIG. 2 is a vertical view of the packer scale of FIG. 1.

FIG. 6 shows a timing chart of opening/closing of gates for use in the packer scale of FIG. 1.

FIG. 7 is a view showing an example of throw-in operation, weighing operation, and discharge operation of the objects which are performed by the packer scale according to the embodiment of the present invention.

DESCRIPTION OF EMBODIMENTS

Hereinafter, a specific exemplary configuration of a weighing apparatus according to an embodiment of the present invention will be described with reference to the drawings.

Hereinafter, throughout the drawings, the same or corresponding components are identified by the same reference symbols and will not be described in repetition.

The description below is merely intended to recite features of the weighing apparatus. For example, when wordings which are the same as those which identify the weighing apparatus or corresponding wordings are assigned by reference symbols to specifically describe a specific example below, specific components are an example of the corresponding components of the weighing apparatus.

Therefore, the features of the weighing apparatus are in no way intended to be limited by description provided below.

Embodiment

Figures 1A, 1B:
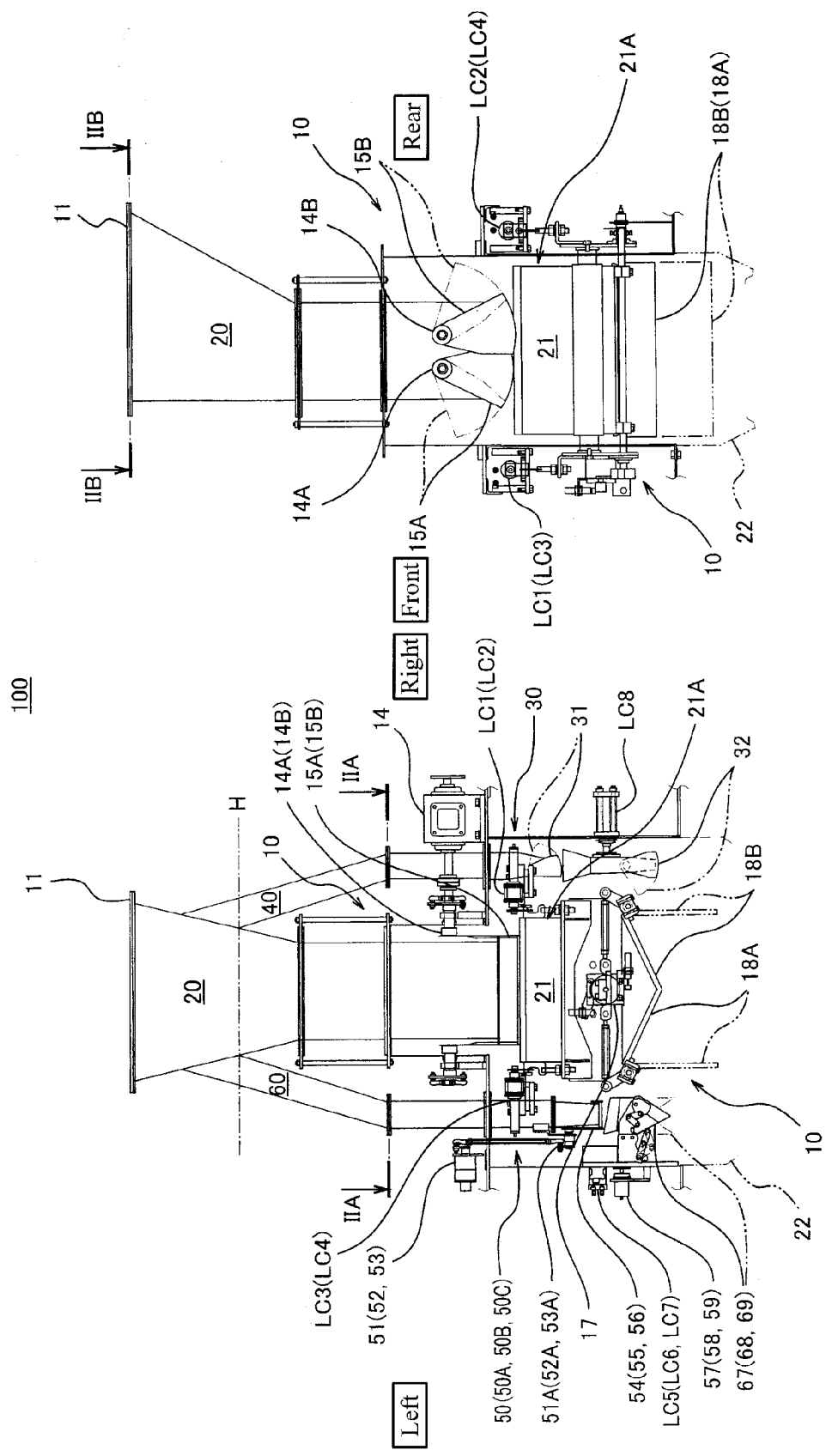
FIG. 1 is a view showing an example of a packer scale (weighing apparatus) according to an embodiment of the present invention.
Figure 2A:
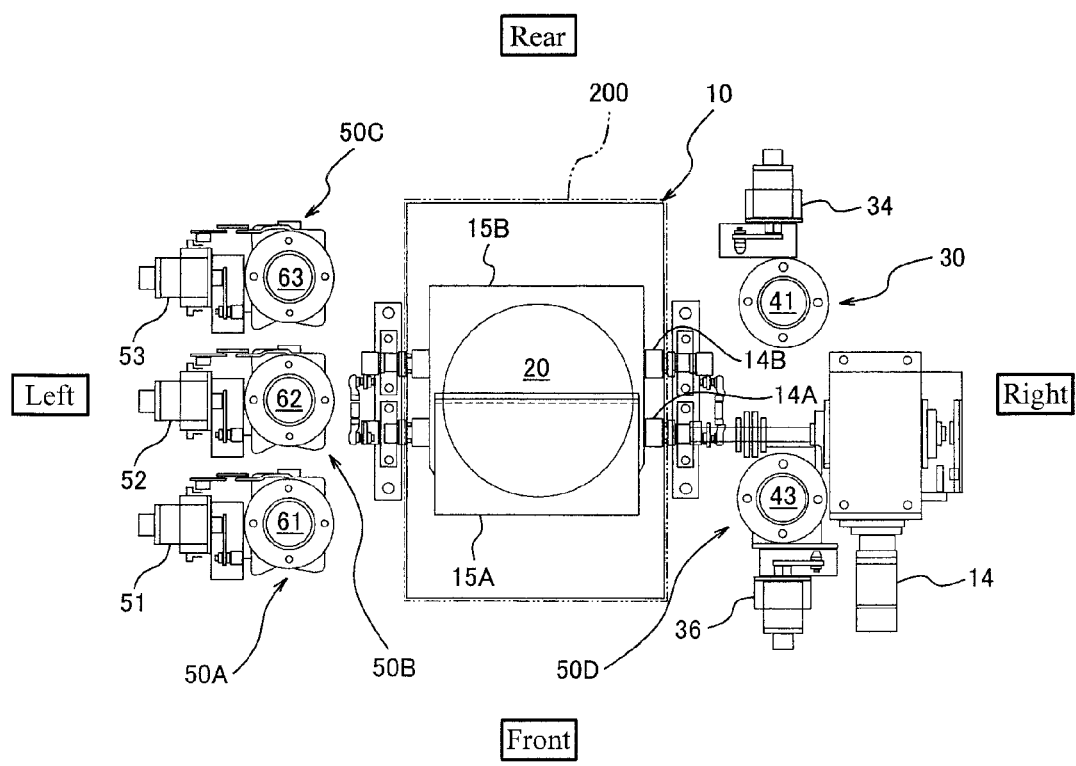
FIG. 2A is a view of the packer scale of FIG. 1A, taken in the direction of arrows along line IIA-IIA of FIG. 1A.
Figure 2B:
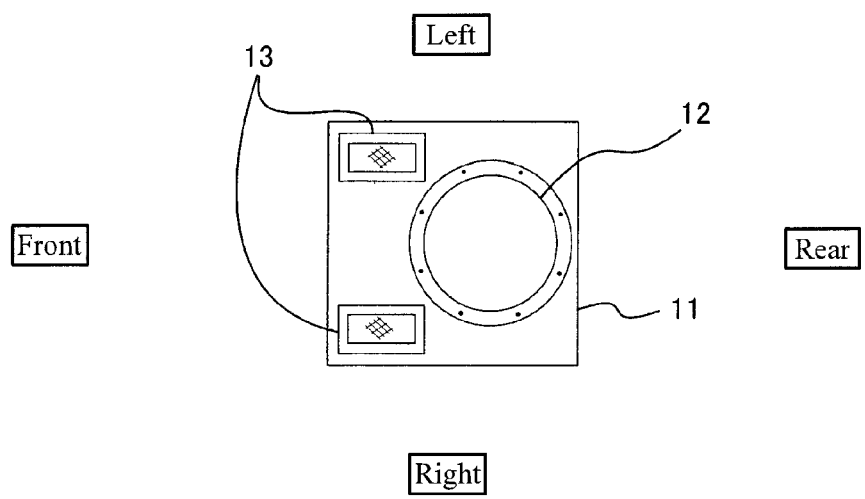
FIG. 2B is a view of the packer scale of FIG. 1B, taken in the direction of arrows along line IIB-IIB of FIG. 1B.

FIG. 1 is a view showing an example of a packer scale (weighing apparatus) according to an embodiment of the present invention. FIG. 2 is a vertical view of the packer scale of FIG. 1. FIG. 2A is a view of the packer scale 100 of FIG. 1A, taken in the direction of arrows along line IIA-IIA of FIG. 1A. FIG. 2B is a view of the packer scale 100 of FIG. 1B, taken in the direction of arrows along line IIB-IIB of FIG. 1B.

As shown in FIGS. 1 and 2, the packer scale 100 of the present embodiment includes a large throw-in weighing unit 10 which performs large throw-in of the objects (e.g., resin pellets) (large amount throw-in) to a packaging machine (not shown), a medium throw-in weighing unit 50 which performs medium throw-in of the objects (medium amount throw-in) to the packaging machine, and a small throw-in weighing unit 30 which performs small throw-in of the objects (small amount throw-in) to the packaging machine.

In description below, in FIG. 1 (the same applies to FIGS. 2, 3 and 4), a direction in which the objects are divided to be fed to the medium throw-in weighing unit 50 and to the small throw-in weighing unit 30 from a location (vertical height H) of the large throw-in weighing unit 10, is expressed as "rightward-leftward direction". And, a side where main components of the medium throw-in weighing unit 50 are placed is expressed as "left" and a side where the small throw-in weighing unit 30 is placed is expressed as "right".

A direction in which a gravitational force is applied is a vertical direction (not shown), and the gravitational force is applied in a direction from "upper side" (not shown) to "lower side" (not shown).

A direction perpendicular to the rightward-leftward direction and the vertical direction is a forward-rearward direction. In FIG. 1A, a near side in the drawing is expressed as "front" and a far side in the drawing is expressed as "rear."

For easier understanding of a configuration of the small throw-in weighing unit 30 in the packer scale 100, FIG. 1A does not show components (fourth medium throw-in weighing unit 50D as will be described later) which are placed at a right side in the packer scale 100.

For easier understanding of a configuration of the large throw-in weighing unit 10 in the packer scale 100, FIG. 1B shows only the configuration of the large throw-in weighing unit 10 in the packer scale 100.

Figure 3:
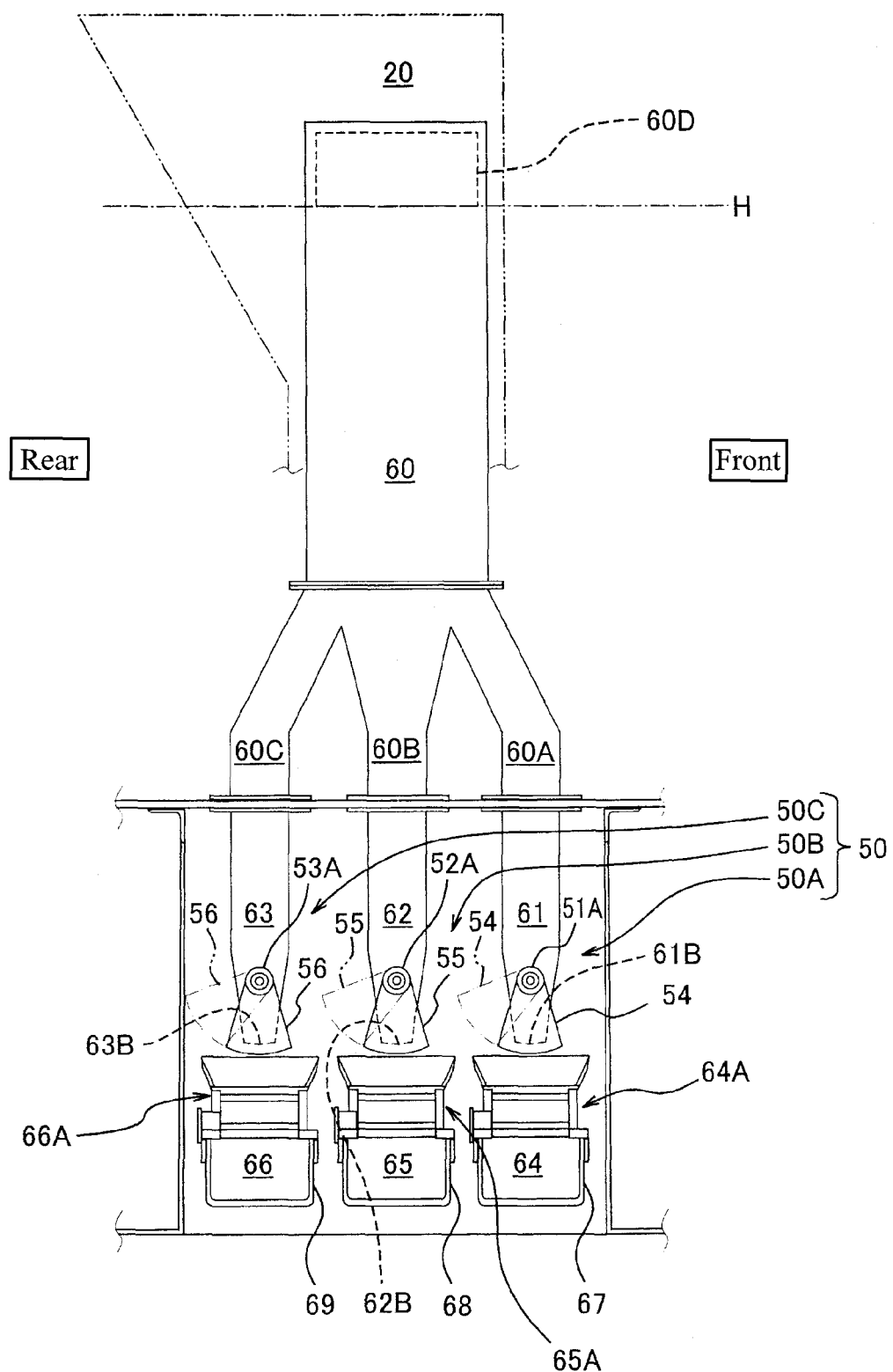
FIG. 3 is a view showing an example of a configuration of first, second and third medium throw-in weighing units in the packer scale of FIG. 1.
Figure 4:
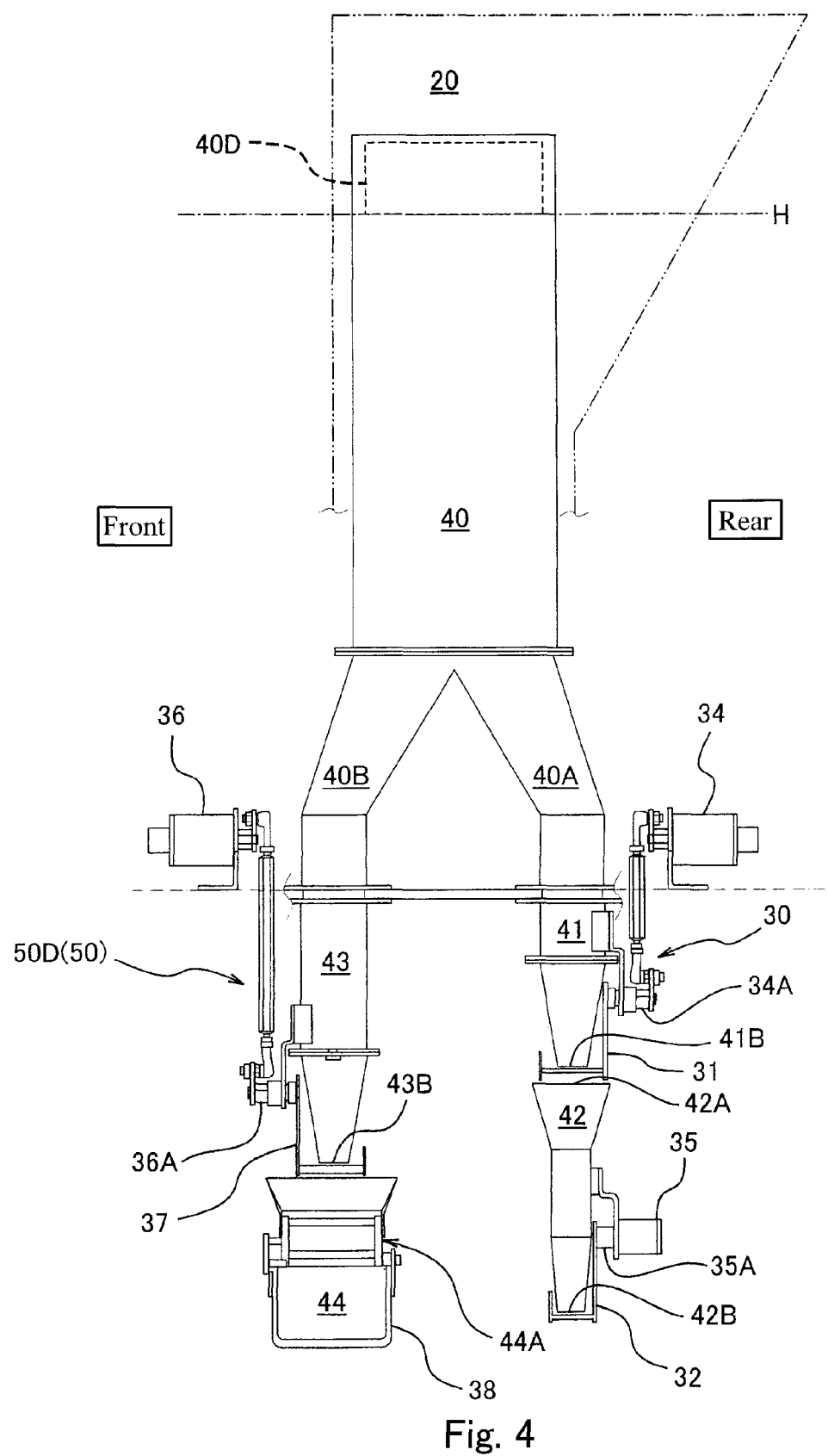
FIG. 4 is a view showing an example of a configuration of a fourth medium throw-in weighing unit in the packer scale of FIG. 1, and an example of a configuration of a small throw-in weighing unit in the packer scale of FIG. 1.
Figure 5:
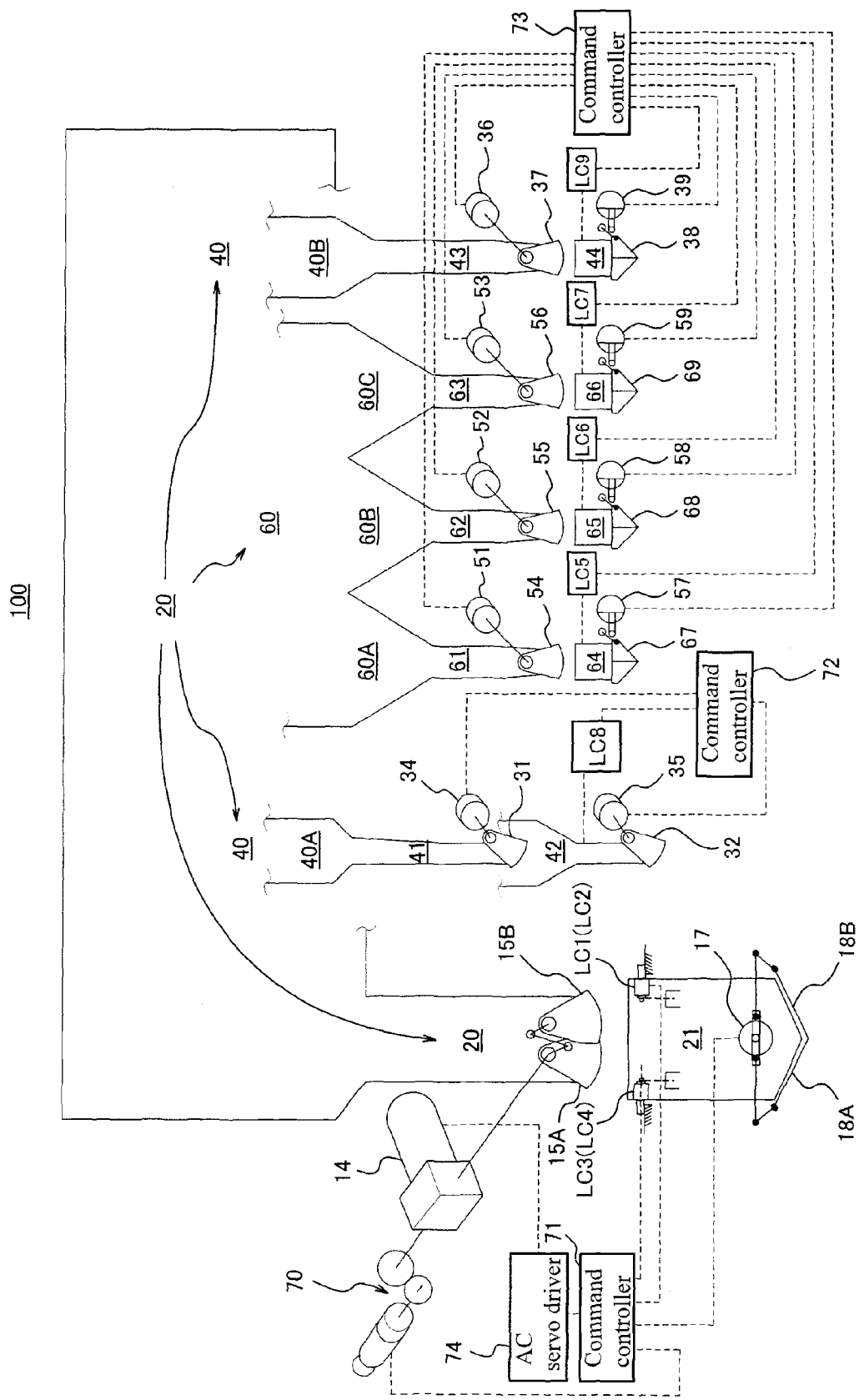
FIG. 5 is a view showing an example of a control system of the packer scale of FIG. 1.

FIG. 3 shows a configuration of major components (first, second and third medium throw-in weighing units 50A, 50B, and 50C as will be described later) of the medium throw-in weighing unit 50 placed at a left side in the packer scale 100. FIG. 4 shows a configuration of a part of (fourth medium throw-in weighing unit 50D as will be described later) of the medium throw-in weighing unit 50 placed at a right side in the packer scale 100, and a configuration of the small throw-in weighing unit 30 placed at a right side in the packer scale 100. FIG. 5 shows an example of a control system in the packer scale 100.

[Configuration of Large Throw-in Weighing Unit]

First of all, the configuration of the large throw-in weighing unit 10 in the packer scale 100 of the present embodiment will be described in detail with reference to the drawings.

As shown in FIG. 1, the large throw-in weighing unit 10 includes a weighing hopper body 20 extending vertically, and a large throw-in weighing hopper 21 placed below the weighing hopper body 20.

As shown in FIGS. 1 and 2, the weighing hopper body 20 is placed at a center portion of the packer scale 100, and is a box-shape component having an upper end portion 11 and a lower end portion.

As shown in FIG. 2B, the upper end portion 11 of the weighing hopper body 20 has, in a center portion at a rear side thereof, a circular feeding port 12 used to feed the objects. Through the feeding port 12, the objects are thrown-in to inside of the weighing hopper body 20.

As shown in FIG. 2B, the upper end portion 11 of the weighing hopper body 20 has, in front corner portions thereof, a pair of mesh-like air release ports 13. When the objects are thrown-in to the weighing hopper body 20 through the feeding port 12, air sometimes flows into the weighing hopper body 20 along with the objects. Because of this, in the packer scale 100 of the present embodiment, the air is exhausted from inside of the weighing hopper body 20 through the air release ports 13. This makes it possible to keep a bulk density of the objects inside of the weighing hopper body 20 at a constant value.

The weighing hopper body 20 has at a lower end portion thereof a discharge outlet (not shown) used to discharge the objects. Thus, the objects are discharged from the discharge outlet to outside of the weighing hopper body 20 (in the present embodiment, to inside of the large throw-in weighing hopper 21).

When the objects are not discharged from the discharge outlet of the weighing hopper body 20 (the objects are held inside of the weighing hopper body 20 for a specified time), this discharge outlet can be closed by a pair of large throw-in cut gates 15A and 15B, as shown in FIG. 1.

As shown in FIG. 1B, the large throw-in cut gates 15A and 15B are pivotable (swingable) around rotary shafts 14A and 14B, respectively, in the forward-rearward direction. The rotary shafts 14A and 14B are rotated by a driving force exerted by an AC servo motor 14 (see FIGS. 1A, 2 and 5), thereby causing the large throw-in cut gates 15A and 15B to move in a forward direction and in a rearward direction, respectively. At this time, as shown in FIG. 5, opening degrees of the large throw-in cut gates 15A and 15B are controlled by a command controller 71 for controlling the large throw-in weighing unit, using a rotary encoder 70.

The discharge outlet of the weighing hopper body 20 is opened by the large throw-in cut gates 15A and 15B. Thus, the objects of a predetermined amount are fed from inside of the weighing hopper body 20 to inside of the large throw-in weighing hopper 21. As shown in FIG. 5, activation of the AC servo motor 14 is controlled by the command controller 71 by using an AC servo driver 74.

As shown in FIG. 1, the large throw-in weighing hopper 21 includes a large throw-in weighing hopper body 21A and a pair of large throw-in weighing hopper gates 18A and 18B, to hold the objects fed from the weighing hopper body 20 for a specified time and discharge the objects to a collecting chute 22 placed therebelow.

The large throw-in weighing hopper 21 is coupled to four load cells LC1, LC2, LC3 and LC4, and supported by the load cells LC1, LC2, LC3 and LC4. The load cells LC1, LC2, LC3 and LC4 are fastened to a platform of the packer scale 100.

As shown in FIG. 5, load signals (electric signals) output from the load cells LC1, LC2, LC3 and LC4 are input to the command controller 71 via a known signal processing circuit (A/D converter, amplifier, filter, etc.; not shown).

As shown in FIG. 1, below the large throw-in weighing hopper 21, the collecting chute 22 is placed. The objects discharged from the large throw-in weighing hopper 21 slide down on the collecting chute 22, and then are sent to, for example, a packaging machine (not shown), through a discharge outlet (not shown) at a bottom portion thereof.

As shown in FIG. 1A, the large throw-in weighing hopper gates 18A and 18B are swingable to left and right, by using a link unit including a known toggle mechanism. That is, the link unit moves by a driving force of the rotary actuator 17 (see FIG. 5), thereby causing the large throw-in weighing hopper gates 18A and 18B to move to left and right, respectively. As shown in FIG. 5, activation of the rotary actuator 17 is controlled by the command controller 71.

In the above described configuration, in the packer scale 100 of the present embodiment, the command controller 71 is able to measure the weight of the objects inside of the large throw-in weighing hopper body 21A based on the signals output from the load cells LC1, LC2, LC3 and LC4. Thereafter, when the command controller 71 receives, for example, a discharge permission signal of the objects from the packaging machine, the discharge outlet of the large throw-in weighing hopper 21 is opened by the large throw-in weighing hopper gates 18A and 18B, and as a result, the weighed objects are sent to the collecting chute 22.

[Configuration of Medium Throw-in Weighing Unit]

Hereinafter, a configuration of the medium throw-in weighing unit 50 of the packer scale 100 of the present invention will be described in detail with reference to the drawings.

As shown in FIGS. 1, 2 and 3, the medium throw-in weighing unit 50 includes a first medium throw-in weighing unit 50A, a second medium throw-in weighing unit 50B, and a third medium throw-in weighing unit 50C. In addition, as shown in FIGS. 2 and 4, the medium throw-in weighing unit 50 includes a fourth medium throw-in weighing unit 50D.

[Configuration of First Medium Throw-in Weighing Unit 50A]

Firstly, a configuration of the first medium throw-in weighing unit 50A will be described.

As shown in FIGS. 2 and 3, the first medium throw-in weighing unit 50A includes a first medium throw-in chute 61, and a first medium throw-in weighing hopper 64 placed below the first medium throw-in chute 61.

As shown in FIGS. 2 and 3, the first medium throw-in chute 61 is placed in a front portion at a left side in the packer scale 100. The first medium throw-in chute 61 has an upper end portion and a lower end portion 61B (see FIG. 3) and extends vertically to form a substantially cylindrical body. An interior (upper end portion) of the first medium throw-in chute 61 is communicated with an interior of the weighing hopper body 20 via a intermediate section 60 (see FIG. 1) which has a hollow structure and is connected to a left side surface of the weighing hopper body 20 and a first medium throw-in branch section 60A which has a hollow structure and branches at a lower end portion of the intermediate section 60 to form a front branch section.

The lower end portion 61B of the first medium throw-in chute 61 has a discharge outlet used to discharge the objects (not shown). Thus, the objects are discharged from the discharge outlet to outside of the first medium throw-in chute 61 (in the present embodiment, inside of the first medium throw-in weighing hopper 64).

When the objects are not discharged from the discharge outlet of the first medium throw-in chute 61 (the objects are held inside of the first medium throw-in chute 61 for a specified time), this discharge outlet can be closed by a first medium throw-in cut gate 54, as shown in FIG. 3.

As shown in FIG. 3, the first medium throw-in cut gate 54 is pivotable (swingable) in the forward-rearward direction around a rotary shaft 51A. That is, the rotary shaft 51A is rotated by a driving force exerted by a rotary actuator 51 (see FIGS. 1, 2, and 5), thereby causing the first medium throw-in cut gate 54 placed immediately below the discharge outlet of the first medium throw-in chute 61 to be retracted in the rearward direction.

In the above described manner, the discharge outlet of the first medium throw-in chute 61 is opened by the first medium throw-in cut gate 54. Thereby, the objects of a predetermined amount are fed from inside of the first medium throw-in chute 61 to inside of the first medium throw-in weighing hopper 64. As shown in FIG. 5, activation of the rotary actuator 51 is controlled by a command controller 73 for controlling the medium throw-in weighing unit.

As shown in FIGS. 1 and 3, the first medium throw-in weighing hopper 64 includes a first medium throw-in weighing hopper body 64A and a first medium throw-in weighing hopper gate 67, to hold the objects fed from the first medium throw-in chute 61 for a specified time and discharge the objects to the collecting chute 22 (see FIG. 1) placed therebelow.

As shown in FIGS. 1 and 5, the first medium throw-in weighing hopper 64 is coupled to a load cell LC5 and supported by the load cell LC5. The load cell LC5 is fastened to the platform of the packer scale 100.

As shown in FIG. 5, a load signal (electric signal) output from the load cell LC5 is input to the command controller 73 via the known signal processing circuit (A/D converter, amplifier, filter, etc.; not shown).

As shown in FIG. 1, below the first medium throw-in weighing hopper 64, the collecting chute 22 is placed. The objects discharged from the first medium throw-in weighing hopper 64 slide down on the collecting chute 22, and then are sent to, for example, the packaging machine (not shown), through the discharge outlet (not shown) at the bottom portion thereof.

As shown in FIG. 1A, the first medium throw-in weighing hopper gate 67 is openable and closable, by using a known toggle mechanism and a driving force exerted by a rotary actuator 57 (see FIG. 5). As shown in FIG. 5, activation of the rotary actuator 57 is controlled by the command controller 73. As a driving device of the first medium throw-in weighing hopper gate 67, a stepping motor may be used instead of the rotary actuator 57.

In the above described configuration, in the packer scale 100 of the present embodiment, the command controller 73 is able to measure the weight of the objects inside of the first medium throw-in weighing hopper body 64A based on the signal output from the load cell LC5. Thereafter, when the command controller 71 receives, for example, a discharge permission signal of the objects from the packaging machine, the discharge outlet of the first medium throw-in weighing hopper 64 is opened by the first medium throw-in weighing hopper gate 67, and as a result, the weighed objects are sent to the collecting chute 22.

[Configuration of Second Medium Throw-in Weighing Unit 50B]

Next, a configuration of the second medium throw-in weighing unit 50B will be described.

As shown in FIGS. 2 and 3, the second medium throw-in weighing unit 50B includes a second medium throw-in chute 62, and a second medium throw-in weighing hopper 65 placed below the second medium throw-in chute 62.

As shown in FIGS. 2 and 3, the second medium throw-in chute 62 is placed in a center portion at a left side in the packer scale 100. The second medium throw-in chute 62 has an upper end portion and a lower end portion 62B (see FIG. 3) and extends vertically to form a substantially cylindrical body. An interior (upper end portion) of the second medium throw-in chute 62 is communicated with an interior of the weighing hopper body 20 via the intermediate section 60 (see FIG. 1) which has a hollow structure and is connected to the left side surface of the weighing hopper body 20 and a second medium throw-in branch section 60B which has a hollow structure and branches at the lower end portion of the intermediate section 60 to form a center branch section.

The lower end portion 62B of the second medium throw-in chute 62 has a discharge outlet (not shown) used to discharge the objects. Thus, the objects are discharged from the discharge outlet to outside of the second medium throw-in chute 62 (in the present embodiment, inside of the second medium throw-in weighing hopper 65).

When the objects are not discharged from the discharge outlet of the second medium throw-in chute 62 (the objects are held inside of the second medium throw-in chute 62 for a specified time), this discharge outlet can be closed by a second medium throw-in cut gate 55, as shown in FIG. 3.

As shown in FIG. 3, the second medium throw-in cut gate 55 is pivotable (swingable) in the forward-rearward direction around a rotary shaft 52A. That is, the rotary shaft 52A is rotated by a driving force exerted by a rotary actuator 52 (see FIGS. 1, 2, and 5), thereby causing the second medium throw-in cut gate 55 placed immediately below the discharge outlet of the second medium throw-in chute 62 to be retracted in the rearward direction.

In the above described configuration, the discharge outlet of the second medium throw-in chute 62 is opened by the second medium throw-in cut gate 55. Thus, the objects of a predetermined amount are fed from inside of the second medium throw-in chute 62 to inside of the second medium throw-in weighing hopper 65. As shown in FIG. 5, activation of the rotary actuator 52 is controlled by the command controller 73.

As shown in FIGS. 1 and 3, the second medium throw-in weighing hopper 65 includes a second medium throw-in weighing hopper body 65A and a second medium throw-in weighing hopper gate 68, to hold the objects fed from the second medium throw-in chute 62 for a specified time and discharge the objects to the collecting chute 22 (see FIG. 1) placed therebelow.

As shown in FIGS. 1 and 5, the second medium throw-in weighing hopper 65 is coupled to a load cell LC6 and supported by the load cell LC6. The load cell LC6 is fastened to the platform of the packer scale 100.

As shown in FIG. 5, a load signal (electric signal) output from the load cell LC6 is input to the command controller 73 via the known signal processing circuit (A/D converter, amplifier, filter, etc.; not shown).

As shown in FIG. 1, below the second medium throw-in weighing hopper 65, the collecting chute 22 is placed. The objects discharged from the second medium throw-in weighing hopper 65 slide down on the collecting chute 22, and then are sent to, for example, the packaging machine (not shown), through the discharge outlet (not shown) at the bottom portion thereof.

As shown in FIG. 1A, the second medium throw-in weighing hopper gate 68 is openable and closable, by using a known toggle mechanism and a driving force exerted by a rotary actuator 58 (see FIG. 5). As shown in FIG. 5, activation of the rotary actuator 58 is controlled by the command controller 73. As a driving device of the second medium throw-in weighing hopper gate 68, a stepping motor may be used instead of the rotary actuator 58.

In the above described configuration, in the packer scale 100 of the present embodiment, the command controller 73 is able to measure the weight of the objects inside of the second medium throw-in weighing hopper body 65A based on the signal output from the load cell LC6. Thereafter, when the command controller 73 receives, for example, a discharge permission signal of the objects from the packaging machine, the discharge outlet of the second medium throw-in weighing hopper 65 is opened by the second medium throw-in weighing hopper gate 68, and as a result, the weighed objects are sent to the collecting chute 22.

[Configuration of Third Medium Throw-in Weighing Unit 50C]

Next, a configuration of the third medium throw-in weighing unit 50C will be described.

As shown in FIGS. 2 and 3, the third medium throw-in weighing unit 50C includes a third medium throw-in chute 63, and a third medium throw-in weighing hopper 66 placed below the third medium throw-in chute 63.

As shown in FIGS. 2 and 3, the third medium throw-in chute 63 is placed in a rear portion at a left side in the packer scale 100. The third medium throw-in chute 63 has an upper end portion and a lower end portion 63B (see FIG. 3) and extends vertically to form a substantially cylindrical body. An interior (upper end portion) of the third medium throw-in chute 63 is communicated with the interior of the weighing hopper body 20 via the intermediate section 60 (see FIG. 1) which has a hollow structure and is connected to the left side surface of the weighing hopper body 20 and a third medium throw-in branch section 60C which has a hollow structure and branches at the lower end portion of the intermediate section 60 to form a rear branch section.

The lower end portion 63B of the third medium throw-in chute 63 has a discharge outlet (not shown) used to discharge the objects. Thus, the objects are discharged from the discharge outlet to outside of the third medium throw-in chute 63 (in the present embodiment, inside of the third medium throw-in weighing hopper 66).

When the objects are not discharged from the discharge outlet of the third medium throw-in chute 63 (the objects are held inside of the third medium throw-in chute 63 for a specified time), this discharge outlet can be closed by a third medium throw-in cut gate 56, as shown in FIG. 3.

As shown in FIG. 3, the third medium throw-in cut gate 56 is pivotable (swingable) in the forward-rearward direction around a rotary shaft 53A. That is, the rotary shaft 53A is rotated by a driving force exerted by the rotary actuator 53 (see FIGS. 1, 2, and 5), thereby causing the third medium throw-in cut gate 56 placed immediately below the discharge outlet of the third medium throw-in chute 63 to be retracted in the rearward direction.

In the above described manner, the discharge outlet of the third medium throw-in chute 63 is opened by the third medium throw-in cut gate 56. Thus, the objects of a predetermined amount are fed from inside of the third medium throw-in chute 63 to inside of the third medium throw-in weighing hopper 66. As shown in FIG. 5, activation of the rotary actuator 53 is controlled by the command controller 73.

As shown in FIGS. 1 and 3, the third medium throw-in weighing hopper 66 includes a third medium throw-in weighing hopper body 66A and a third medium throw-in weighing hopper gate 69, to hold the objects fed from the third medium throw-in chute 63 for a specified time and discharge the objects to the collecting chute 22 (see FIG. 1) placed therebelow.

As shown in FIGS. 1 and 5, the third medium throw-in weighing hopper 66 is coupled to a load cell LC7 and supported by the load cell LC7. The load cell LC7 is fastened to the platform of the packer scale 100.

As shown in FIG. 5, a load signal (electric signal) output from the load cell LC7 is input to the command controller 73 via the known signal processing circuit (A/D converter, amplifier, filter, etc.; not shown).

As shown in FIG. 1, below the third medium throw-in weighing hopper 66, the collecting chute 22 is placed. The objects discharged from the third medium throw-in weighing hopper 66 slide down on the collecting chute 22, and then are sent to, for example, the packaging machine (not shown), through the discharge outlet (not shown) at the bottom portion thereof.

As shown in FIG. 1A, the third medium throw-in weighing hopper gate 69 is openable and closable, by using a known toggle mechanism and a driving force exerted by a rotary actuator 59 (see FIG. 5). As shown in FIG. 5, activation of the rotary actuator 59 is controlled by the command controller 73. As a driving device of the third medium throw-in weighing hopper gate 69, a stepping motor may be used instead of the rotary actuator 59.

In the above described configuration, in the packer scale 100 of the present embodiment, the command controller 73 is able to measure the weight of the objects inside of the third medium throw-in weighing hopper body 66A based on the signal output from the load cell LC7. Thereafter, when the command controller 73 receives, for example, a discharge permission signal of the objects from the packaging machine, the discharge outlet of the third medium throw-in weighing hopper 66 is opened by the third medium throw-in weighing hopper gate 69, and as a result, the weighed objects are sent to the collecting chute 22.

[Configuration of Fourth Medium Throw-in Weighing Unit 50D]

Next, a configuration of the fourth medium throw-in weighing unit 50D will be described.

As shown in FIGS. 2 and 4, the fourth medium throw-in weighing unit 50D includes a fourth medium throw-in chute 43, and a fourth medium throw-in weighing hopper 44 placed below the fourth medium throw-in chute 43.

As shown in FIGS. 2 and 4, the fourth medium throw-in chute 43 is placed in a front portion at a right side in the packer scale 100. The fourth medium throw-in chute 43 has an upper end portion and a lower end portion 43B (see FIG. 4) and extends vertically to form a substantially cylindrical body. An interior (upper end portion) of the fourth medium throw-in chute 43 is communicated with the interior of the weighing hopper body 20 via a intermediate section 40 (see FIG. 1) which has a hollow structure and is connected to a right side surface of the weighing hopper body 20 and a fourth medium throw-in branch section 40B which has a hollow structure and branches at the lower end portion of the intermediate section 40 to form a front branch section.

The lower end portion 43B of the fourth medium throw-in chute 43 has a discharge outlet used to discharge the objects (not shown). Thus, the objects are discharged from the discharge outlet to outside of the fourth medium throw-in chute 43 (in the present embodiment, inside of the fourth medium throw-in weighing hopper 44).

When the objects are not discharged from the discharge outlet of the fourth medium throw-in chute 43 (the objects are held inside of the fourth medium throw-in chute 43 for a specified time), this discharge outlet can be closed by a fourth medium throw-in cut gate 37, as shown in FIG. 4.

As shown in FIG. 4, the fourth medium throw-in cut gate 37 is pivotable (swingable) in a rightward-leftward direction around a rotary shaft 36A. That is, the rotary shaft 36A is rotated by a driving force exerted by a rotary actuator 36 (see FIGS. 2 and 5), thereby causing the fourth medium throw-in cut gate 37 placed immediately below the discharge outlet of the fourth medium throw-in chute 43 to be retracted.

The discharge outlet of the fourth medium throw-in chute 43 is opened by the fourth medium throw-in cut gate 37. Thus, the objects of a predetermined amount are fed from inside of the fourth medium throw-in chute 43 to inside of the fourth medium throw-in weighing hopper 44. As shown in FIG. 5, activation of the rotary actuator 36 is controlled by the command controller 73.

As shown in FIG. 4, the fourth medium throw-in weighing hopper 44 includes a fourth medium throw-in weighing hopper body 44A and a fourth medium throw-in weighing hopper gate 38, to hold the objects fed from the fourth medium throw-in chute 43 for a specified time and discharge the objects to the collecting chute 22 (see FIG. 1) placed therebelow.

The fourth medium throw-in weighing hopper 44 is coupled to a load cell LC9 (see FIG. 5) and supported by the load cell LC9. The load cell LC9 is fastened to the platform of the packer scale 100.

As shown in FIG. 5, a load signal (electric signal) output from the load cell LC9 is input to the command controller 73 via the known signal processing circuit (A/D converter, amplifier, filter, etc.; not shown).

As shown in FIG. 1, below the fourth medium throw-in weighing hopper 44, the collecting chute 22 is placed. The objects discharged from the fourth medium throw-in weighing hopper 44 slide down on the collecting chute 22, and then are sent to, for example, the packaging machine (not shown), through the discharge outlet (not shown) at the bottom portion thereof.

The fourth medium throw-in weighing hopper gate 38 is openable and closable, by using a known toggle mechanism (not shown) and a driving force exerted by a rotary actuator 39 (see FIG. 5). As shown in FIG. 5, activation of the rotary actuator 39 is controlled by the command controller 73. As a driving device of the fourth medium throw-in weighing hopper gate 38, a stepping motor may be used instead of the rotary actuator 39.

In the above described configuration, in the packer scale 100 of the present embodiment, the command controller 73 is able to measure the weight of the objects inside of the fourth medium throw-in weighing hopper body 44A based on the signal output from the load cell LC9. Thereafter, when the command controller 73 receives, for example, a discharge permission signal of the objects from the packaging machine, the discharge outlet of the fourth medium throw-in weighing hopper 44 is opened by the fourth medium throw-in weighing hopper gate 38, and as a result, the weighed objects are sent to the collecting chute 22.

[Configuration of Small Throw-in Weighing Unit]

Hereinafter, a configuration of the small throw-in weighing unit 30 in the packer scale 100 of the present embodiment will be described in detail with reference to the drawings.

As shown in FIGS. 1, 2, and 4, the small throw-in weighing unit 30 includes a loss-in throw-in chute 41, and a loss-in hopper 42 placed below the loss-in throw-in chute 41.

As shown in FIGS. 1, 2, and 4, the loss-in throw-in chute 41 is placed in a rear portion at a right side in the packer scale 100. The loss-in throw-in chute 41 has an upper end portion and a lower end portion 41B (see FIG. 4) and extends vertically to form a substantially cylindrical body. An interior (upper end portion) of the loss-in throw-in chute 41 is communicated with the interior of the weighing hopper body 20 via the intermediate section 40 (see FIG. 1) which has a hollow structure and is connected to the right side surface of the weighing hopper body 20 and a small throw-in section 40A which has a hollow structure and branches at a lower end portion of the intermediate section 40 to form a rear branch section.

The lower end portion 41B of the loss-in throw-in chute 41 has a discharge outlet used to discharge the objects (not shown). Thus, the objects are discharged from the discharge outlet to outside of the loss-in throw-in chute 41 (in the present embodiment, inside of the loss-in hopper 42).

When the objects are not discharged from the discharge outlet of the loss-in throw-in chute 41 (the objects are held inside of the loss-in throw-in chute 41 for a specified time), this discharge outlet can be closed by a loss-in throw-in gate 31, as shown in FIGS. 1 and 4.

As shown in FIGS. 1 and 4, the loss-in throw-in gate 31 is pivotable (swingable) in the rightward-leftward direction around a rotary shaft 34A. That is, the rotary shaft 34A is rotated by a driving force exerted by a rotary actuator 34 (see FIGS. 2 and 5), thereby causing the loss-in throw-in gate 31 placed immediately below the discharge outlet of the loss-in throw-in chute 41 to be retracted in a rightward direction (see FIG. 1).

In the above described manner, the discharge outlet of the loss-in throw-in chute 41 is opened by the loss-in throw-in gate 31. Thus, the objects of a predetermined amount are fed from inside of the loss-in throw-in chute 41 to inside of the loss-in hopper 42. As shown in FIG. 5, activation of the rotary actuator 34 is controlled by a command controller 72 for controlling the small throw-in weighing unit.

Like the loss-in throw-in chute 41, the loss-in hopper 42 is placed in a rear portion at a right side in the packer scale 100. The loss-in hopper 42 has an upper end portion 42A (see FIG. 4) and a lower end portion 42B (see FIG. 4) and extends vertically to form a substantially cylindrical body. That is, the loss-in throw-in chute 41 and the loss-in hopper 42 are arranged vertically with a common center axis (not shown).

The lower end portion 42B of the loss-in hopper 42 has a discharge outlet (not shown) used to discharge the objects. Thus, the objects are discharged from the discharge outlet to outside of the loss-in hopper 42 (in the present embodiment, collecting chute 22).

When the objects are not discharged from the discharge outlet of the loss-in hopper 42 (the objects are held inside of the loss-in hopper 42 for a specified time), this discharge outlet can be closed by a loss-in discharge gate 32 (auxiliary hopper), as shown in FIGS. 1 and 4.

As shown in FIGS. 1 and 4, the loss-in discharge gate 32 is pivotable (swingable) in the rightward-leftward direction around a rotary shaft 35A. That is, the rotary shaft 35A is rotated by a driving force exerted by a rotary actuator 35 (see FIG. 5), thereby causing the loss-in discharge gate 32 placed immediately below the discharge outlet of the loss-in hopper 42 to be retracted in a leftward direction (see FIG. 1).

In the above described manner, the discharge outlet of the loss-in hopper 42 is opened by the loss-in discharge gate 32. Thus, the objects are fed from inside of the loss-in hopper 42 to the collecting chute 22. As shown in FIG. 5, activation of the rotary actuator 35 is controlled by a command controller 72.

As shown in FIG. 1, the loss-in hopper 42 is coupled to a load cell LC8 (see FIG. 5) and supported by the load cell LC8. The load cell LC8 is fastened to the platform of the packer scale 100.

As shown in FIG. 5, a load signal (electric signal) output from the load cell LC8 is input to the command controller 72 via the known signal processing circuit (A/D converter, amplifier, filter, etc.; not shown).

In the above described configuration, in the packer scale 100 of the present embodiment, when the command controller 72 receives, for example, a discharge permission signal of the objects from the packaging machine, the discharge outlet of the loss-in hopper 42 is opened by the loss-in discharge gate 32, and as a result, loss-in discharge of the objects from inside of the fourth medium throw-in weighing hopper body 44A is performed based on the signal output from the load cell LC8. A diameter of the loss-in hopper 42 is set to a suitable value based on a bulk density of the objects so that a discharge amount of the objects per unit time is constant in this loss-in discharge. This enables the objects of a proper amount to be sent to the collecting chute 22 within predetermined time.

[Configuration of Control System of Packer Scale]

Each of the above stated command controllers 71, 72, and 73 is configured to comprise a processor section (not shown) including, for example, a microcontroller, a MPU, a PLC (Programmable Logic Controller), a logic circuit or the like, a memory section (not shown) including a ROM, a RAM, or the like, a display section (not shown) including a weight display section, a message display section (not shown) or the like, and a key input section (not shown) by which an operator can input various data.

In the packer scale 100 of the present embodiment, as shown in FIG. 5, the command controllers 71, 72, and 73 are configured as three controllers which cooperate with each other to execute decentralized control. However, the configuration of the command controllers 71, 72, and 73 is not limited to this. For example, the command controllers 71, 72, and 73 may be configured as a single controller to execute centralized control.

As described above, the command controller 71 controls the operation of the actuators (the AC servo motor 14, the rotary actuator 17, or the like) for opening and closing the large throw-in cut gates 15A and 15B, and the large throw-in weighing hopper gates 18A and 18B. The command controller 71 also serves as a weight calculating means which receives the signals output from the load cells LC1, LC2, LC3, and LC4, respectively, supporting the large throw-in weighing hopper 21, and calculates a weight of the objects held in the large throw-in weighing hopper 21 based on these signals.

As described above, the command controller 72 controls the operation of the actuators (the rotary actuators 34 and 35, or the like) for opening and closing the loss-in throw-in gate 31 and the loss-in discharge gate 32. The command controller 72 also serves as a weight calculating means which receives the signal output from the load cell LC8 supporting the loss-in hopper 42, and calculates a weight of the objects held in the loss-in hopper 42. That is, in the packer scale 100 of the present embodiment, the command controller 72 always monitors the weight of the objects inside of the loss-in hopper 42, by using the load cell LC8. Therefore, when the weight of the objects inside of the loss-in hopper 42 decreases by a set weight from an initial weight of the objects before the discharge, the command controller 72 closes the discharge outlet of the loss-in hopper 42 by using the loss-in discharge gate 32. By using loss-in weighing using the small throw-in weighing unit 30, a discharge amount of the objects can be adjusted accurately.

As described above, the command controller 73 controls the operation of the actuators (the rotary actuators 51, 52, 53, 36, 57, 58, 59, 39) for opening and closing the first, second, third and fourth medium throw-in cut gates 54, 55, 56 and 37, and the first, second, third and fourth medium throw-in weighing hopper gates 67, 68, 69, and 38. The command controller 73 also serves as a weight calculating means which receives the signals output from the load cells LC5, LC6, LC7, and LC9, respectively, supporting the first, second, third, and fourth medium throw-in weighing hoppers 64, 65, 66 and 44, and calculates weights of the objects held inside of the first, second, third and fourth medium throw-in weighing hoppers 64, 65, 66 and 44 based on these signals.

Furthermore, the command controller 73 serves as a combination means which performs a combination process. This combination process is performed in such a manner that the objects having weights adjusted with a different ratio (its detail will be described later) are fed to the first, second, third, and fourth medium throw-in weighing hoppers 64, 65, 66 and 44. That is, in the combination process, combination calculation is performed based on the four weights of the objects adjusted with the above different ratio, to find a combination made up of any of the first, second, third, and fourth medium throw-in weighing hoppers 64, 65, 66 and 44, in which a total weight of the objects is closest to a combination target weight (its detail will be described later). And in the combination process, the objects are discharged from the medium throw-in weighing hoppers selected to make up the combination to the collecting chute.

[Throw-in Operation, Weighing Operation and Discharge Operation of Objects which are Performed by Packer Scale]

Hereinafter, an example of throw-in operation, weighing operation and discharge operation of the objects (e.g., resin pellets) which are performed by the packer scale 100 of the present embodiment will be described with reference to the drawings.

Figure 6:
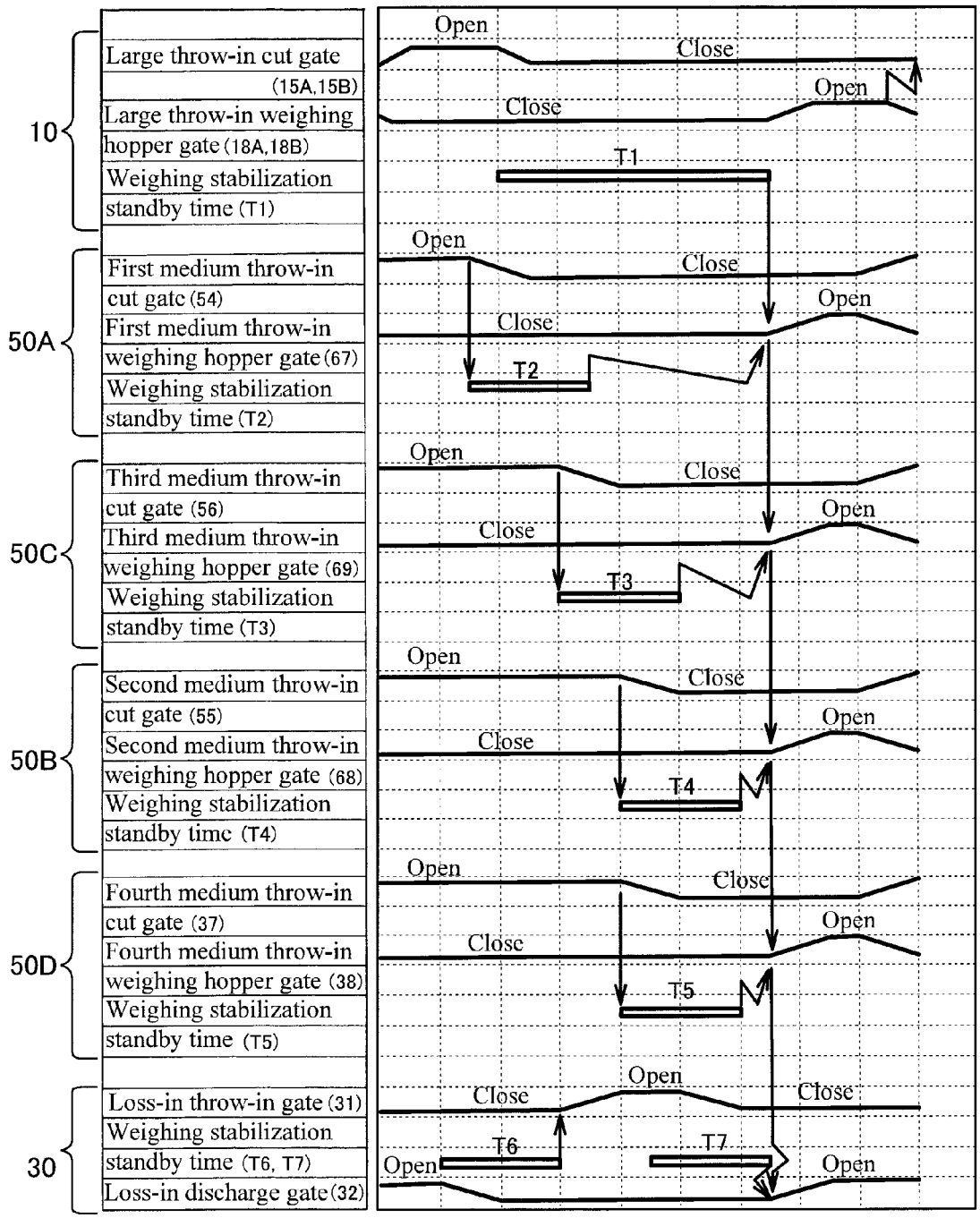
FIG. 6 is a view showing an example of throw-in operation, weighing operation, and discharge operation of objects which are performed by the packer scale according to the embodiment of the present invention.
Figure 7A:
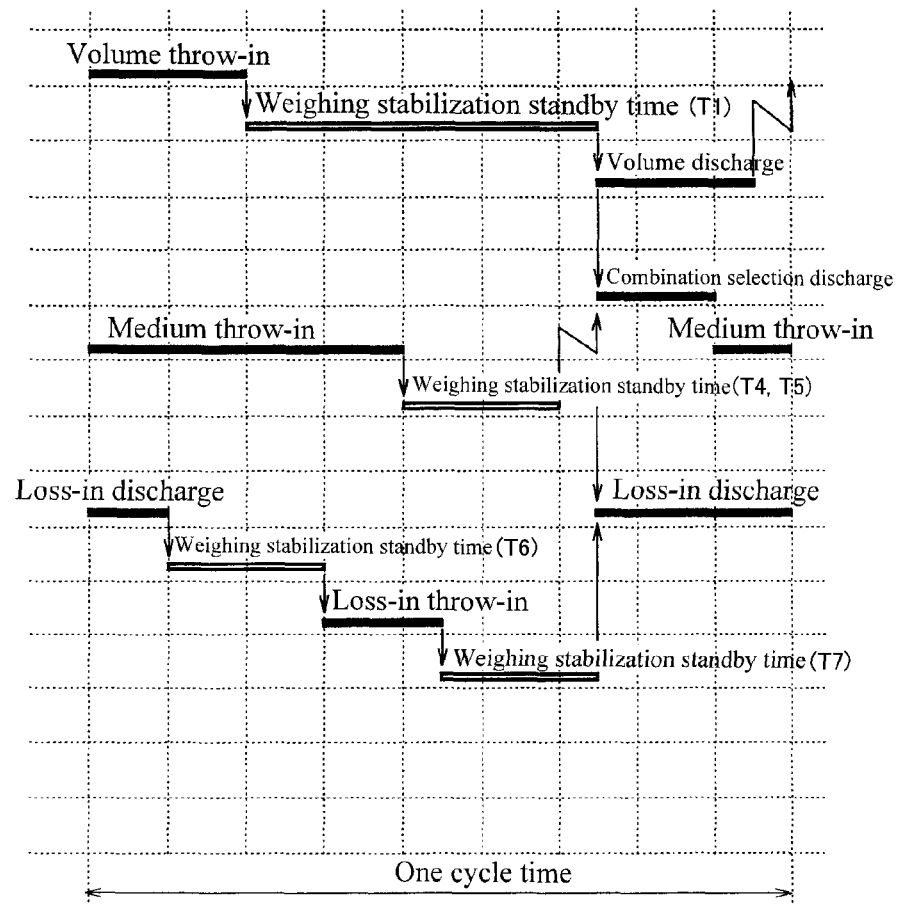
FIG. 7A shows a timing chart of throw-in and discharge of the objects which are performed by the packer scale of FIG. 1.
Figure 7B:
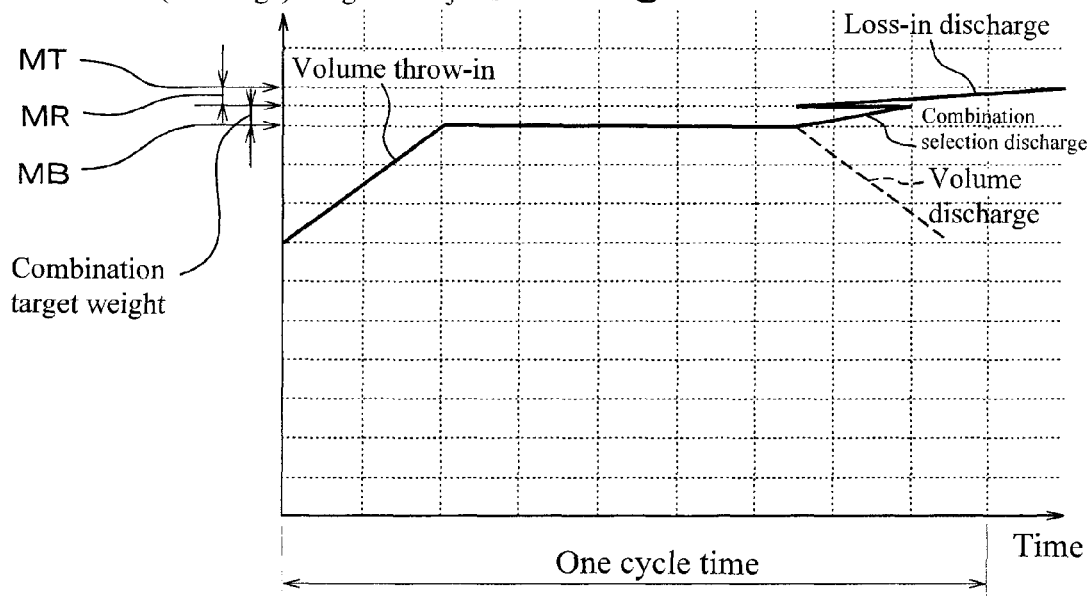
FIG. 7B shows a change in a weight of the objects of throw-in (discharge) performed by the packer scale of FIG. 1, which change occurs with time.

FIGS. 6 and 7 are views showing the example of the throw-in operation, the weighing operation, and the discharge operation of the objects which are performed by the packer scale according to the embodiment of the present invention. FIG. 6 shows a timing chart of opening/closing of the gates for use in the packer scale 100 of the present embodiment. FIG. 7A shows a timing chart of the throw-in and discharge of the objects which are performed by the packer scale of FIG. 1. FIG. 7B shows a change in a weight of the objects of the throw-in (discharge) performed by the packer scale of FIG. 1, which change occurs with time.

Initially, a preparation work of the throw-in operation, the weighing operation, and the discharge operation of the objects which are performed by the packer scale 100 according to the embodiment, the operator throws-in the objects to inside of the weighing hopper body 20 through the feeding port 12. At this time, the gates for use in the packer scale 100 are all closed.

Thereupon, the objects fed through the feeding port 12 fall downward inside of the weighing hopper body 20 by its own weight and are deposited inside of the weighing hopper body 20. At a time point when the objects inside of the weighing hopper body 20 reaches a predetermined vertical height H (see FIGS. 1A, 3 and 4), the objects start to fall toward the right intermediate section 40 and the left intermediate section 60 through an opening 40D and an opening 60D, respectively. As shown in FIG. 3, the objects falling through the opening 60D are divided at the lower end portion of the intermediate section 60 to move toward the first, second and third medium throw-in branch sections 60A, 60B, and 60C, and fall downward inside of the first, second and third medium throw-in branch sections 60A, 60B, and 60C by its own weight. As a result, the objects are deposited inside of the first, second and third medium throw-in chutes 61, 62 and 63. As shown in FIG. 4, the objects falling through the opening 40D are divided at the lower end portion of the intermediate section 40 to move toward the fourth medium throw-in branch section 40B and the small throw-in branch section 40A, and fall downward inside the fourth medium throw-in branch section 40B and the small throw-in branch section 40A by its own weight. As a result, the objects are deposited inside of the fourth medium throw-in chute 43 and the loss-in throw-in chute 41. The objects may be thrown-in through the feeding port 12 so that the objects are finally filled inside the weighing hopper body 20 and the intermediate sections 40 and 60.

When an operation start button (not shown) of the packer scale 100 is pressed, after the above described preparation work of the throw-in operation, the weighing operation, and the discharge operation of the objects is completed, the command controllers 71, 72 and 73 (hereinafter simply referred to as "controller") execute the operation as described below while controlling the respective sections of the packer scale 100 based on the control programs used to execute the respective sections of the packer scale 100.

Firstly, in the large throw-in weighing unit 10 of FIG. 6, the large throw-in cut gates 15A and 15B move to open the discharge outlet of the weighing hopper body 20. Thereby, as shown in FIGS. 7A and 7B, volume throw-in (feeding) of the objects from inside of the weighing hopper body 20 to inside of the large throw-in weighing hopper 21 is performed.

At this time, the controller controls the opening degrees of the large throw-in cut gates 15A and 15B and the open time of the discharge outlet of the weighing hopper body 20, thereby adjusting a volume throw-in weight MB of the objects to the large throw-in weighing hopper 21 based on the bulk density of the objects so that the volume throw-in weight MB reaches a weight (e.g., about 98% of a target weight MT) which is a little smaller than the target weight MT of the objects. That is, in the packer scale 100 of the present embodiment, the controller is able to feed the objects of a proper amount (volume throw-in weight MB) smaller than the target weight MT to the large throw-in weighing hopper 21, by timer charging, by using the large throw-in cut gates 15A and 15B which are present immediately above the large throw-in weighing hopper 21. After a passage of weighing stabilization standby time T1 of the load cells LC1, LC2, LC3, and LC4, the controller can calculate the volume throw-in weight MB based on the signals output from the load cells LC1, LC2, LC3, and LC4. Thus, the controller can calculate a deficient weight with respect to the target weight MT (target weight MT−volume throw-in weight MB). As a result, the controller can decide a loss-in discharge weight MR (see FIG. 7B) of the objects from the loss-in hopper 42, and hence select an optimal combination made up of any of the first, second, third, and fourth medium throw-in weighing hoppers 64, 65, 66 and 44.

Thereafter, as shown in FIG. 6, the controller opens the discharge outlet of the large throw-in weighing hopper 21 by using the large throw-in weighing hopper gates 18A and 18B, at suitable time, to perform volume discharge (see FIGS. 7A and 7B) of the objects through this discharge outlet.

In the first medium throw-in weighing unit 50A of FIG. 6, the discharge outlet of the first medium throw-in chute 61 is opened by using the first medium throw-in cut gate 54 while the above volume throw-in of the objects is performed. Thereby, medium throw-in (feeding) of the objects from inside of the first medium throw-in chute 61 to inside of the first medium throw-in weighing hopper 64 is performed.

At this time, the controller controls the open time of the discharge outlet of the first medium throw-in chute 61, thereby adjusting a throw-in weight S1 of the objects to the first medium throw-in weighing hopper 64 based on the bulk density of the objects so that the throw-in weight S1 has a predetermined weight ratio. After a passage of weighing stabilization standby time T2 of the load cell LC5, the controller can calculate the throw-in weight S1 of the objects based on the signal output from the load cell LC5.

Thereafter, as shown in FIG. 6, in a case where the first medium throw-in weighing hopper 64 is selected based on the combination calculation, the controller opens the discharge outlet of the first medium throw-in weighing hopper 64 by using the first medium throw-in weighing hopper gate 67 at suitable time (e.g., just after a passage of the weighing stabilization standby time T1), to perform combination selection discharge of the objects through this discharge outlet (see FIGS. 7A and 7B).

In the third medium throw-in weighing unit 50C of FIG. 6, the discharge outlet of the third medium throw-in chute 63 is opened by using the third medium throw-in cut gate 56 while the volume throw-in of the objects is performed. Thereby, medium throw-in (feeding) of the objects from inside of the third medium throw-in chute 63 to inside of the third medium throw-in weighing hopper 66 is performed.

At this time, the controller controls the open time of the discharge outlet of the third medium throw-in chute 63, thereby adjusting a throw-in weight S2 of the objects to the third medium throw-in weighing hopper 66 based on the bulk density of the objects so that the throw-in weight S2 has a predetermined ratio (e.g., the predetermined ratio is twice as great as that of the throw-in weight S1). Since the throw-in weight S2 is twice as great as the throw-in weight S1 in this case, the open time of the discharge outlet of the third medium throw-in chute 63 is longer than the open time of the discharge outlet of the first medium throw-in chute 61. After a passage of weighing stabilization standby time T3 of the load cell LC7, the controller can calculate the throw-in weight S2 of the objects based on the signal output from the load cell LC7.

Thereafter, as shown in FIG. 6, in a case where the third medium throw-in weighing hopper 66 is selected based on the combination calculation, the controller opens the discharge outlet of the third medium throw-in weighing hopper 66 by using the third medium throw-in weighing hopper gate 69 at suitable time (e.g., just after a passage of the weighing stabilization standby time T1), to perform combination selection discharge of the objects through this discharge outlet (see FIGS. 7A and 7B).

In the second medium throw-in weighing unit 50B of FIG. 6, the discharge outlet of the second medium throw-in chute 62 is opened by using the second medium throw-in cut gate 55 while the above volume throw-in of the objects is performed. Thereby, medium throw-in (feeding) of the objects from inside of the second medium throw-in chute 62 to inside of the second medium throw-in weighing hopper 65 is performed.

At this time, the controller controls the open time of the discharge outlet of the second medium throw-in chute 62, thereby adjusting a throw-in weight S3 of the objects to the second medium throw-in weighing hopper 65 based on the bulk density of the objects so that the throw-in weight S3 has a predetermined ratio (e.g., the predetermined ratio is four times as great as that of the throw-in weight S1). Since throw-in weight S3 is four times as great as the throw-in weight S1 in this case, the open time of the discharge outlet of the second medium throw-in chute 62 is longer than the open time of the discharge outlet of the first medium throw-in chute 61 and the open time of the discharge outlet of the third medium throw-in chute 63. After a passage of the weighing stabilization standby time T3 of the load cell LC6, the controller can calculate the throw-in weight S2 of the objects based on the signal output from the load cell LC6.

Thereafter, as shown in FIG. 6, in a case where the second medium throw-in weighing hopper 65 is selected based on the combination calculation, the controller opens the discharge outlet of the second medium throw-in weighing hopper 65 by using the second medium throw-in weighing hopper gate 68 at suitable time (e.g., just after a passage of the weighing stabilization standby time T1), to perform combination selection discharge of the objects through this discharge outlet (see FIGS. 7A and 7B).

In the fourth medium throw-in weighing unit 50D of FIG. 6, the discharge outlet of the fourth medium throw-in chute 43 is opened by using the fourth medium throw-in cut gate 37 while the above volume throw-in of the objects is performed. Thereby, medium throw-in (feeding) of the objects from inside of the fourth medium throw-in chute 43 to inside of the fourth medium throw-in weighing hopper 44 is performed.

At this time, the controller controls the open time of the discharge outlet of the fourth medium throw-in chute 43, thereby adjusting a throw-in weight S4 of the objects to the fourth medium throw-in weighing hopper 44 based on the bulk density of the objects so that the throw-in weight S4 has a predetermined ratio (e.g., the predetermined ratio is eight times as great as that of the throw-in weight S1). Since the throw-in weight S4 is eight times as great as the throw-in weight S1 in this case, the open time of the discharge outlet of the fourth medium throw-in chute 43 is longer than the open time of the discharge outlet of the first medium throw-in chute 61 and the open time of the discharge outlet of the third medium throw-in chute 63. After a passage of weighing stabilization standby time T5 of the load cell LC7, the controller can calculate the throw-in weight S4 of the objects based on the signal output from the load cell LC7.

Thereafter, as shown in FIG. 6, in a case where the fourth medium throw-in weighing hopper 44 is selected based on the combination calculation, the controller opens the discharge outlet of the fourth medium throw-in weighing hopper 44 by using the fourth medium throw-in weighing hopper gate 38 at suitable time (e.g., just after a passage of the weighing stabilization standby time T1), to perform combination selection discharge of the objects through this discharge outlet (see FIGS. 7A and 7B).

In the small throw-in weighing unit 30 of FIG. 6, the controller opens the discharge outlet of the loss-in throw-in chute 41 by using the loss-in throw-in gate 31. Thereby, loss-in throw-in (feeding) of the objects from inside of the loss-in throw-in chute 41 to inside of the loss-in hopper 42 is performed.

At this time, since the controller monitors the signal output from the load cell LC8 supporting the loss-in hopper 42, the controller can close the discharge outlet of the loss-in throw-in chute 41 by using the loss-in throw-in gate 31, at a time point when the throw-in weight of the objects to the loss-in hopper 42 reaches a deficient weight of the objects (e.g., weight of the objects used in a previous cycle). After a passage of weighing stabilization standby time T7 of the load cell LC8 in the loss-in throw-in, the controller opens the discharge outlet of the loss-in hopper 42 by using the loss-in discharge gate 32 at suitable time (e.g., just after a passage of the weighing stabilization standby time T1), to perform loss-in discharge of the objects of a small amount (e.g., less than the throw-in weight S1) through this discharge outlet, while calculating loss-in weight of the objects based on the signal output from the load cell LC8 (see FIGS. 7A and 7B). After a passage of the weighing stabilization standby time T6 of the load cell LC8 in the loss-in discharge, loss-in throw-in (feeding) of the objects from inside of the loss-in throw-in chute 41 to inside of the loss-in hopper 42 is performed again.

The packer scale 100 of the present embodiment can achieve advantages as described below.

Firstly, among the timing of the volume throw-in (timer charging) of the objects to the large throw-in weighing hopper 21, the timings of the medium throw-in of the objects to the first, second, third, and fourth medium throw-in weighing hoppers 64, 65, 66 and 44, and the timing of the loss-in throw-in of the objects to the loss-in hopper 42, at least a pair of throw-in timings overlap with each other. More specifically, the timing of the volume throw-in (timer charging) of the objects to the large throw-in weighing hopper 21 overlaps with the timings of the medium throw-in of the objects to the first, second, third, and fourth medium throw-in weighing hoppers 64, 65, 66 and 44.

In addition, the first, second, third and fourth medium throw-in cut gates 54, 55, 56 and 37 are opened almost at the same time, and are closed at suitable times according to the throw-in weights S1, S2, S3, and S4.

In the above described configuration, in the packer scale 100 of the present embodiment, weighing (throw-in) speed of the objects can be increased, and hence one cycle time of throw-in, weighing and discharge of the objects which are performed by the packer scale 100 can be reduced.

Secondly, the timing of the volume discharge of the objects from the large throw-in weighing hopper 21, the timings of the combination selection discharge of the objects from the first, second, third, and fourth medium throw-in weighing hoppers 64, 65, 66 and 44, and the timing of the loss-in discharge of the objects from the loss-in hopper 42 overlap with each other.

In addition, the first, second, third, and fourth medium throw-in weighing hopper gates 67, 68, 69, and 38 and the loss-in discharge gate 32 are opened almost at the same time, and the first, second, third, and fourth medium throw-in weighing hopper gates 67, 68, 69, and 38 are closed almost at the same time.

In the above described configuration, in the packer scale 100 of the present embodiment, weighing (discharge) speed of the objects can be increased, and hence one cycle time of throw-in, weighing and discharge of the objects which are performed by the packer scale 100 can be reduced.

Thirdly, volume throw-in of a most part (e.g., equal to greater than 95%) of the objects to the large throw-in weighing hopper 21 is performed with a proper amount at a time, by using timer charging of the objects using the large throw-in cut gates 15A and 15B of the large throw-in weighing unit 10.

In the above described configuration, in the packer scale 100 of the present embodiment, weighing (throw-in) speed of the objects can be increased, and hence one cycle time of throw-in, weighing and discharge of the objects which are performed by the packer scale 100 can be reduced.

Fourthly, after a passage of the weighing stabilization standby time T1 of the load cells LC1, LC2, LC3, and LC4, the first, second, third, and fourth medium throw-in weighing hopper gates 67, 68, 69, and 38 and the loss-in discharge gate 32 are opened promptly. In addition, when the first, second, third, and fourth medium throw-in weighing hopper gates 67, 68, 69, and 38 are being closed, respectively, the first, second, third and fourth medium throw-in cut gates 54, 55, 56 and 37 have already started to be opened.

In the above described configuration, in the packer scale 100 of the present embodiment, weighing speed of the objects can be increased, and hence one cycle time of throw-in, weighing and discharge of the objects which are performed by the packer scale 100 can be reduced.

Fifthly, the objects having weights adjusted with a different weight ratio (in the present embodiment, the weight ratio is such that the throw-in weight S1:the throw-in weight S2:the throw-in weight S3:the throw-in weight S4=1:2:4:8) are fed to the first, second, third, and fourth medium throw-in weighing hoppers 64, 65, 66 and 44. Thus, combination calculation can be performed based on the weights of the objects inside of the first, second, third, and fourth medium throw-in weighing hoppers 64, 65, 66 and 44.

After a passage of the weighing stabilization standby time T1 of the load cells LC1, LC2, LC3, and LC4, after performing the volume throw-in of the objects to the large throw-in weighing hopper 21, the controller can calculate the volume throw-in weight MB based on the signals output from the load cells LC1, LC2, LC3, and LC4 supporting the large throw-in weighing hopper 21. Therefore, the combination target weight used in the above combination calculation can be set based on the target weight MT of the objects, the volume throw-in weight MB of the objects, and the loss-in discharge weight MR of the objects.

For example, as shown in FIG. 7B, the loss-in discharge weight MR which is suitable for the loss-in discharge is predetermined, the loss-in discharge weight MR is subtracted from the target weight MT of the objects, and a difference between the difference weight (MT−MR) and the volume throw-in weight MB of the objects may be set as the combination target weight.

In the above described manner, in the packer scale 100 of the present embodiment, highly-accurate loss-in discharge can be used to adjust the weight of the objects so that the target weight MT is finally attained. Therefore, weighing accuracy (cut accuracy) of the objects can be kept high. In the packer scale 100 of the present embodiment, the combination of any of the first, second, third, and fourth medium throw-in weighing hoppers 64, 65, 66 and 44, in which a total weight of the objects held therein is closest to the combination target weight, is found, and combination selection discharge of the objects held inside the hoppers selected to make up the combination is performed. Therefore, it becomes possible to appropriately perform the loss-in discharge of the objects for adjusting the weight of the objects so that target weight MT is finally attained (e.g., a loss-in discharge amount can be set small), following the combination selection discharge of the objects. This results in improvement of weighing speed and weighing accuracy (cut accuracy) of the objects.

Sixthly, as shown in FIGS. 1, 2, 3, and 4, in a plan view of the large throw-in weighing hopper 21, the plurality of first, second, third, and fourth medium throw-in weighing hoppers 64, 65, 66 and 44, and the loss-in hopper 42 (hereinafter simply referred to as "weighing/loss-in hoppers 64, 65, 66, 44, and 42) are placed around the large throw-in weighing hopper 21.

Since in the packer scale 100 of the present embodiment, the five weighing/loss-in hoppers 64, 65, 66, 44, and 42 are placed in suitable locations surrounding the large throw-in weighing hopper 21, around the large throw-in weighing hopper 21, a space saving structure is provided, in which the objects are discharged from the weighing/loss-in hoppers 64, 65, 66, 44, and 42 in a non-dispersed manner. When the large throw-in weighing hopper 21 is moved to outside of the packer scale 100, maintenance of the weighing/loss-in hoppers 64, 65, 66, 44, and 42 can be easily carried out.

Seventhly, as shown in FIGS. 1, 2, and 4, when the large throw-in weighing hopper 21 is enclosed by a virtual rectangle 200 (see virtual line in FIG. 2) in a plan view of the large throw-in weighing hopper 21, the fourth medium throw-in weighing hopper 44, of the first, second, third, and fourth medium throw-in weighing hoppers 64, 65, 66 and 44, and the low-in hopper 42, are aligned at front and rear locations so as to face one side of the rectangle 200 along the one side of the rectangle 200, as shown in FIGS. 2 and 4. In this case, the ratio of the weight of the objects inside of the fourth medium throw-in weighing hopper 44 is greatest. In this example, as described above, the ratio of the weight (throw-in weight S4) of the objects inside of the fourth medium throw-in weighing hopper 44 is set to a value which is eight times as great as the ratio of the throw-in weight S1 of the first medium throw-in weighing hopper 64.

In the above described manner, as shown in FIG. 4, the fourth medium throw-in weighing hopper 44 in which the ratio of the weight of the objects is greatest is placed such that the fourth medium throw-in weighing hopper 44 and the loss-in hopper 42 in which the throw-in amount of the objects is smallest are aligned at front and rear locations. Therefore, it becomes easier to ensure a desired throw-in amount required for the throw-in of the objects to the fourth medium throw-in weighing hopper 44 (i.e., throw-in of the objects from the intermediate section 40 toward the fourth medium throw-in branch section 40B). As a result, weighing speed of the objects can be increased, and hence one cycle time of throw-in, weighing and discharge of the objects which are performed by the packer scale 100 can be reduced.

Eighthly, as shown in FIGS. 1, 2, and 3, when the large throw-in weighing hopper 21 is enclosed by a virtual rectangle 200 (see virtual line in FIG. 2) in a plan view of the large throw-in weighing hopper 21, the first, second, and third medium throw-in weighing hoppers 64, 65, and 66, of the first, second, third, and fourth medium throw-in weighing hoppers 64, 65, 66 and 44, are aligned at front and rear locations so as to face one side of the rectangle 200 along the one side of the rectangle 200, as shown in FIGS. 2 and 3. In this case, in a state in which the first, second, and third medium throw-in weighing hoppers 64, 65, and 66 are aligned, the ratio of the weight of the objects inside of the second medium throw-in weighing hopper 65 located at a center is greater than the ratios of the weights of the objects inside of the first and third medium throw-in weighing hoppers 64 and 66 which are located at ends. In this example, as described above, the ratio of the weight (throw-in weight S3) of the objects inside of the second medium throw-in weighing hopper 65 is set to a value which is four times as great as the ratio of the throw-in weight S1 of the first medium throw-in weighing hopper 64. The ratio of the weight (throw-in weight S2) of the objects inside of the third medium throw-in weighing hopper 66 is set to a value which is twice as great as the ratio of the throw-in weight S1 of the first medium throw-in weighing hopper 64

In the above described manner, as shown in FIG. 3, in the state in which the first, second, and third medium throw-in weighing hoppers 64, 65, and 66 are aligned, the second medium throw-in weighing hopper 65 in which the ratio of the weight of the objects is greater is located at the center, and the first and third medium throw-in weighing hoppers 64 and 66 in which the ratios of the weights of the objects are smaller are located at ends. Therefore, it becomes easier to ensure a desired throw-in amount required for the throw-in of the objects to the second medium throw-in weighing hopper 65 at the center (i.e., throw-in of the objects from the intermediate section 60 toward the second medium throw-in branch section 60B). As a result, weighing speed of the objects can be increased, and hence one cycle time of throw-in, weighing and discharge of the objects which are performed by the packer scale 100 can be reduced.

INDUSTRIAL APPLICABILITY

In accordance with the present invention, it is possible to provide a weighing apparatus which has a space saving structure and makes weighing speed and weighing accuracy of objects higher than those of a conventional example. Therefore, the present invention is applicable to a weighing apparatus which adjusts a weight of the objects such as powdered products (detergent, fertilizer, etc.), or granular products (resin pellets, cereal, feeding stuff, etc.) so that a predetermined target weight is attained, and charges the objects into containers such as bags.

REFERENCE SIGNS LIST

- 10 large throw-in weighing unit
- 11 upper end portion of weighing hopper body
- 12 feeding port of weighing hopper body
- 13 air release section
- 14 AC servo motor
- 15A, 15B large throw-in cut gate
- 17 rotary actuator for large throw-in weighing hopper gate
- 18A, 18B large throw-in weighing hopper gate
- 20 weighing hopper body
- 21 large throw-in weighing hopper
- 21A large throw-in weighing hopper body
- 22 collecting chute
- 30 small throw-in weighing unit
- 31 loss-in throw-in gate
- 32 loss-in discharge gate
- 34 rotary actuator for loss-in throw-in gate
- 35 rotary actuator for loss-in discharge gate
- 36 rotary actuator for fourth medium throw-in cut gate
- 37 fourth medium throw-in cut gate
- 38 fourth medium throw-in weighing hopper gate
- 39 rotary actuator for fourth medium throw-in weighing hopper gate
- 40 intermediate section
- 40A small throw-in branch section
- 40B fourth medium throw-in branch section
- 40D opening
- 41 loss-in throw-in chute
- 42 loss-in hopper
- 43 fourth medium throw-in chute
- 44 fourth medium throw-in weighing hopper
- 44A fourth medium throw-in weighing hopper body
- 50 medium throw-in weighing unit
- 50A first medium throw-in weighing unit
- 50B second medium throw-in weighing unit
- 50C third medium throw-in weighing unit
- 50D fourth medium throw-in weighing unit
- 51 rotary actuator for first medium throw-in cut gate
- 52 rotary actuator for second medium throw-in cut gate
- 53 rotary actuator for third medium throw-in cut gate
- 54 first medium throw-in cut gate
- 55 second medium throw-in cut gate
- 56 third medium throw-in cut gate
- 57 rotary actuator for first medium throw-in weighing hopper gate
- 58 rotary actuator for second medium throw-in weighing hopper gate
- 59 rotary actuator for third medium throw-in weighing hopper gate
- 60 intermediate section
- 60A first medium throw-in branch section
- 60B second medium throw-in branch section
- 60C third medium throw-in branch section
- 60D opening
- 61 first medium throw-in chute
- 62 second medium throw-in chute
- 63 third medium throw-in chute
- 64 first medium throw-in weighing hopper
- 64A first medium throw-in weighing hopper body
- 65 second medium throw-in weighing hopper
- 65A second medium throw-in weighing hopper body
- 66 third medium throw-in weighing hopper
- 66A third medium throw-in weighing hopper body
- 67 first medium throw-in weighing hopper gate
- 68 second medium throw-in weighing hopper gate
- 69 third medium throw-in weighing hopper gate
- 70 rotary encoder
- 71 command controller for controlling large throw-in weighing unit
- 72 command controller for controlling small throw-in weighing unit
- 73 command controller for controlling medium throw-in weighing unit
- 74 AC servo driver
- 100 packer scale (weighing apparatus)
- 200 virtual rectangle

The invention claimed is:

1. A weighing apparatus comprising:
a large throw-in weighing hopper which is fed with objects having a weight which is less than a target weight of the objects, holds the objects which are weighed, and discharges the weighed objects;
a plurality of medium throw-in weighing hoppers including first, second, third and fourth medium throw-in weighing hoppers which are respectively fed with the objects having weights adjusted with a different ratio, hold the objects for which combination calculation is performed based on the weights of the objects, and discharge the objects based on a result of the combination calculation;
a loss-in weight hopper, the loss-in weight hopper including a discharge outlet, the discharge outlet arranged to close by using a discharge gate when a weight of the objects inside of the loss-in weight hopper decreases by a set weight from an initial weight of the objects before discharge;
a weighing hopper body placed above the large throw-in weighing hopper;
a first intermediate chute placed above the first through third medium throw-in weighing hoppers and coupled to the first through third medium throw-in weighing hoppers via first, second, and third throw-in branch sections;
a second intermediate chute placed above the fourth medium throw-in weighing hopper and the loss-in weight hopper and coupled to the fourth medium throw-in weighing hopper and the loss-in weight hopper via a fourth medium throw-in branch section and a small throw-in branch section, respectively; and
first, second and third medium throw-in chutes disposed between the first, second and third throw-in branch sections and the first, second and third medium throw-in weighing hoppers, respectively;

a fourth medium throw-in chute and a loss-in throw-in chute disposed between the fourth throw-in branch sections and the small throw-in branch section, respectively;

wherein the first through fourth medium throw-in weighing hoppers and the loss-in weight hopper are placed in a virtual rectangle around the large throw-in weighing hopper when the large throw-in weighing hopper is viewed in a plan view, with the first through third medium throw-in weighing hoppers disposed along a side of the virtual rectangle and the fourth medium throw-in weighing hopper and the loss-in weight hopper disposed along another side of the virtual rectangle;

the first and second intermediate chutes are in communication with an interior of the weighing hopper body;

wherein the fourth medium throw-in weighing hopper and the loss-in weight hopper are arranged to receive a fourth weight and a fifth weight of the objects;

wherein the first, second and third medium throw-in weighing hoppers are arranged to receive a first, second and third weight of the objects, respectively; and wherein the second medium throw-in weighing hopper is between the first and third medium throw-in weighing hoppers, and wherein second weight is greater than the first and third weights, the fourth weight is greater than the first, second, third weights and fifth weights, and the fifth weight is the smallest.

2. The weighing apparatus according to claim 1, wherein the first through fifth weights are adjusted based on open times of discharge outlets of the first through fourth medium throw-in chutes.

3. The weighing apparatus according to claim 2, wherein throw-in of the objects to the large throw-in weighing hopper is performed by timer charging, using a cut gate operatively coupled to a lower end portion of the weighing hopper body.

4. The weighing apparatus according to claim 2, wherein at least a pair of throw-in timings among a timing at which the objects are thrown-in to the large throw-in weighing hopper, timings at which the objects are thrown-in to the medium throw-in weighing hoppers, and a timing at which the objects are thrown-in to the loss-in weight hopper, overlap with each other.

5. The weighing apparatus according to claim 4, wherein the timing at which the objects are thrown-in to the large throw-in weighing hopper and the timings at which the objects are thrown-in to the medium throw-in weighing hoppers, overlap with each other.

6. The weighing apparatus according to claim 2, wherein in the combination calculation, a combination of the medium throw-in weighing hoppers in which a total weight of the objects inside of the medium throw-in weighing hoppers is closest to a predetermined combination target weight is found, and the objects are discharged from the medium throw-in weighing hoppers selected to make up the combination.

7. The weighing apparatus according to claim 6, wherein the combination target weight is set based on the target weight of the objects, the weight of the objects held inside of the large throw-in weighing hopper, and the weight of the objects in the loss-in discharge.

8. The weighing apparatus according to claim 3, wherein at least a pair of throw-in timings among a timing at which the objects are thrown-in to the large throw-in weighing hopper, timings at which the objects are thrown-in to the medium throw-in weighing hoppers, and a timing at which the objects are thrown-in to the loss-in weight hopper, overlap with each other.

9. The weighing apparatus according to claim 8, wherein the timing at which the objects are thrown-in to the large throw-in weighing hopper and the timings at which the objects are thrown-in to the medium throw-in weighing hoppers, overlap with each other.

10. The weighing apparatus according to claim 3, wherein a timing at which the objects are discharged from the large throw-in weighing hopper, timings at which the objects are discharged from the medium throw-in weighing hoppers, and a timing at which the objects are discharged from the loss-in weight hopper, overlap with each other.

11. The weighing apparatus according to claim 4, wherein a timing at which the objects are discharged from the large throw-in weighing hopper, timings at which the objects are discharged from the medium throw-in weighing hoppers, and a timing at which the objects are discharged from the loss-in weight hopper, overlap with each other.

12. The weighing apparatus according to claim 5, wherein a timing at which the objects are discharged from the large throw-in weighing hopper, timings at which the objects are discharged from the medium throw-in weighing hoppers, and a timing at which the objects are discharged from the loss-in weight hopper, overlap with each other.

13. The weighing apparatus according to claim 8, wherein a timing at which the objects are discharged from the large throw-in weighing hopper, timings at which the objects are discharged from the medium throw-in weighing hoppers, and a timing at which the objects are discharged from the loss-in weight hopper, overlap with each other.

14. The weighing apparatus according to claim 3, wherein in the combination calculation, a combination of the medium throw-in weighing hoppers in which a total weight of the objects inside of the medium throw-in weighing hoppers is closest to a predetermined combination target weight is found, and the objects are discharged from the medium throw-in weighing hoppers selected to make up the combination.

15. The weighing apparatus according to claim 10, wherein in the combination calculation, a combination of the medium throw-in weighing hoppers in which a total weight of the objects inside of the medium throw-in weighing hoppers is closest to a predetermined combination target weight is found, and the objects are discharged from the medium throw-in weighing hoppers selected to make up the combination.

16. A weighing apparatus comprising:

a large throw-in weighing hopper which is fed with objects having a weight which is less than a target weight, and holds, weighs and discharges the weighed objects, wherein the large throw-in weighing hopper is enclosed by a virtual rectangle when viewed in a plan view;

a plurality of medium throw-in weighing hoppers which are respectively fed with the objects, and are arranged to hold the objects for which a combination calculation is performed based on the weights of the objects, and discharge the objects based on a result of the combination calculation;

a loss-in weight hopper including a discharge outlet, the discharge outlet arranged to close by using a discharge gate when a weight of the objects inside of the loss-in weight hopper decreases by a set weight from an initial weight before discharge;

a weighing hopper body placed above the large throw-in weighing hopper;

wherein a first, second and third of the plurality of medium throw-in weighing hoppers are aligned along and face a first side of the virtual rectangle with the second medium throw-in weighing hopper located at a center of the first side;

wherein a fourth medium throw-in weighing hopper and the loss-in weight hopper are aligned along and face a second side of the virtual rectangle;

wherein the first, second and third medium throw-in weighing hoppers are coupled to first, second and third throw in branch sections, respectively, and the first, second and third throw-in branch sections are coupled to an interior of the weighing hopper body via a left intermediate section;

wherein the fourth medium throw-in weighing hopper and the loss-in weight hopper are coupled to a fourth medium throw-in branch section and a small throw-in branch section, respectively, and the fourth throw-in branch section and the small throw-in branch section are coupled to the interior of the weighing hopper body via a right intermediate section;

wherein the first, second and third medium throw-in weighing hoppers are arranged to be fed first, second and third weights of the objects, respectively, and wherein the second weight is greater than the first weight and the third weight; and wherein the fourth medium throw-in weighing hopper is arranged to be fed a fourth weight greater than the first, second and third weights, and wherein the loss-in weight hopper is arranged to be fed a fifth weight smaller than the first, second, third and fourth weights.

17. The weighing apparatus of claim 16, wherein the fourth medium throw-in weighing hopper is adjacent to only the loss-in weight hopper.

18. The weighing apparatus of claim 16, wherein:

the first, second, third and fourth medium throw-in weighing hoppers are fed via first, second, third and fourth throw-in cut gates, respectively, and wherein the loss-in weight hopper is fed via a loss-in throw-in gate;

a controller operatively coupled to the first, second, third, and fourth throw-in cut gates and to the loss-in throw-in gate, the controller arranged to control open and close times of the cut gates and the loss-in throw-in gate during a cycle time; and wherein the second and fourth medium throw-in branch sections are sized and arranged to cooperate with the controller to feed the second weight of objects to the second throw-in weighing hopper and the fourth weight of objects to the fourth medium throw-in weighing hopper in the same duration of open times of the second and fourth throw-in cut gates, respectively.

19. The weighing apparatus of claim 18, wherein the first, second, third and fourth cut gates arranged to open at a same time during the cycle time, and wherein the loss-in throw-in gate is arranged to open at a different time during the cycle time.

20. The weighing apparatus of claim 18, wherein the loss-in weight hopper is coupled to a loss-in weight load cell and includes a discharge outlet arranged to close by using a discharge gate; and wherein the loss-in weight hopper is arranged to be charged when the loss-in throw-in gate is open and the discharge gate is closed, and further wherein, after a stabilization time when the loss-in throw-in gate and the discharge gate are closed, the loss-in weight hopper is discharged while the loss-in throw-in gate is closed by opening the discharge gate.

\* \* \* \* \*